US011772646B2

(12) United States Patent
Fujita et al.

(10) Patent No.: US 11,772,646 B2
(45) Date of Patent: Oct. 3, 2023

(54) DRIVING ASSIST METHOD AND DRIVING ASSIST DEVICE

(71) Applicants: Nissan Motor Co., Ltd., Yokohama (JP); Renault S.A.S., Boulogne-Billancourt (FR)

(72) Inventors: Susumu Fujita, Kanagawa (JP); Yoshiro Takamatsu, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 492 days.

(21) Appl. No.: 17/259,210

(22) PCT Filed: Jul. 12, 2018

(86) PCT No.: PCT/IB2018/000964
§ 371 (c)(1),
(2) Date: Jan. 11, 2021

(87) PCT Pub. No.: WO2020/012212
PCT Pub. Date: Jan. 16, 2020

(65) Prior Publication Data
US 2021/0269024 A1    Sep. 2, 2021

(51) Int. Cl.
*B60W 30/10* (2006.01)
*H04W 4/46* (2018.01)
*B60W 50/12* (2012.01)
(52) U.S. Cl.
CPC ............ *B60W 30/10* (2013.01); *B60W 50/12* (2013.01); *H04W 4/46* (2018.02); *B60W 2552/30* (2020.02)

(58) Field of Classification Search
CPC .. B60W 30/10; B60W 50/12; B60W 2552/30; H04W 4/46
See application file for complete search history.

(56) References Cited

U.S. PATENT DOCUMENTS

| 2021/0237755 A1* | 8/2021 | Lechner | .......... B60W 30/18145 |
| 2021/0268957 A1* | 9/2021 | Fujita | ................ B60W 50/0098 |
| 2021/0269024 A1* | 9/2021 | Fujita | .................... B60W 30/10 |

FOREIGN PATENT DOCUMENTS

| JP | 6-36193 A | 2/1994 |
| JP | 2001-336944 A | 12/2001 |
| JP | 2007-17266 A | 1/2007 |

(Continued)

*Primary Examiner* — Peter D Nolan
*Assistant Examiner* — Wae L Louie
(74) *Attorney, Agent, or Firm* — Global IP Counselors, LLP

(57) ABSTRACT

When a host vehicle enters a roundabout, a travel route of the host vehicle is communicated by a direction indicator to other vehicles surroundings the host vehicle. A controller computes a travel route over which a host vehicle and executes driving assist control so that the host vehicle travels along the travel route. In this driving assist method, whether or not the host vehicle has arrived at a roundabout is assessed. When the host vehicle is assessed to have arrived at a roundabout, a positional relationship between a host vehicle entrance for the host vehicle and a host vehicle exit for the host vehicle in the roundabout is assessed based on the travel route. When the host vehicle enters the roundabout, control of the direction indicator lights is performed in accordance with the positional relationship that was assessed.

12 Claims, 11 Drawing Sheets

(56) References Cited

FOREIGN PATENT DOCUMENTS

| | | |
|---|---|---|
| JP | 2008-87711 A | 4/2008 |
| JP | 2016-138866 A | 8/2016 |
| JP | 2017-109657 A | 6/2017 |
| JP | 2017-111498 A | 6/2017 |

\* cited by examiner

DRIVING ASSIST METHOD AND DRIVING ASSIST DEVICE

CROSS-REFERENCE TO RELATED APPLICATIONS

This application is a U.S. national stage application of International Application No. PCT/IB2018/000964, filed on Jul. 12, 2018.

BACKGROUND

Technical Field

The present invention relates to a driving assist method and a driving assist device.

Background Information

In a conventional navigation device, an arrow display indicating a direction advancing toward an exit road is displayed at every branching point connecting to a circular intersection (roundabout), and the arrow is deleted if the intersection is passed through. Upon nearing the front of an exit road, the arrow display is shown near the left side or right side of the road. For example, a conventional navigation device is disclosed for a circular intersection (roundabout) in Japanese Laid-Open Patent Application No. 2001-336944.

SUMMARY

However, while the conventional device is route guidance technology for circular intersections, this device is also a technique of presenting a timing at which a host vehicle exits a circular intersection, and therefore no mention is made of a direction indicated by a direction indicator light. Therefore, there is a risk with the prior-art device that when the host vehicle enters a roundabout, an action plan of the host vehicle will not be communicated by direction indication to other vehicles in the surroundings of the host vehicle.

The present disclosure was contrived in view of the problem described above, it being an object of the present disclosure to provide a driving assist method and a driving assist device by which an action plan of a host vehicle is communicated by direction indication to other vehicles in the surroundings of the host vehicle when the host vehicle enters a roundabout.

In order to achieve the object described above, the present disclosure comprises a controller that computes a travel route over which a host vehicle is caused to travel and executes driving assist control so that the host vehicle travels along the travel route. In this driving assist method, the controller performs the following control. An assessment is made as to whether or not the host vehicle has arrived at a roundabout. When it is assessed that the host vehicle has arrived at a roundabout, a positional relationship between a host vehicle entrance and a host vehicle exit for the host vehicle in the roundabout is assessed based on the travel route. When the host vehicle enters the roundabout, control of direction indicator lights is performed according to the positional relationship that was assessed. When the direction indicator lights are illuminated by this control, an assessment is made as to whether or not to extinguish the direction indicator lights according to the positional relationship that was assessed. When an assessment to extinguish the direction indicator lights has been made, control to extinguish the direction indicator lights is performed after the host vehicle has entered the roundabout.

Thus, when the host vehicle enters the roundabout, an action plan of the host vehicle can be communicated by direction indication to other vehicles in the surroundings of the host vehicle.

BRIEF DESCRIPTION OF THE DRAWINGS

Referring now to the attached drawings which form a part of this original disclosure.

DETAILED DESCRIPTION OF EMBODIMENTS

Figure 1:
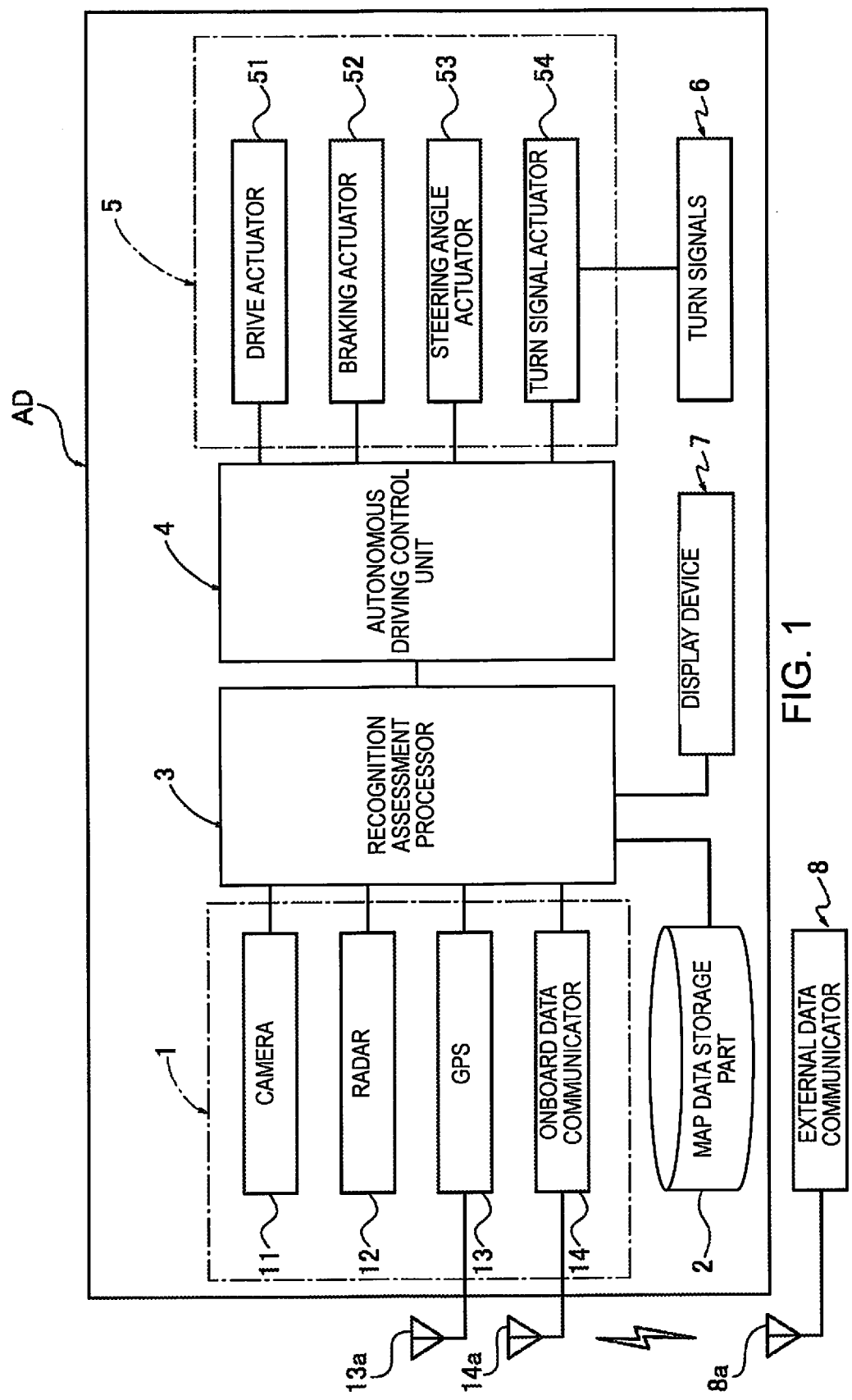
FIG. 1 is an overall system diagram of an autonomous driving control system to which a driving assist method and a driving assist device are applied in accordance with a first embodiment.

The best embodiment for realizing the driving assist method and driving assist device according to the present invention is described below based on the first embodiment shown in the drawings.

First Embodiment

A driving assist method and driving assist device in the first embodiment are applied to an autonomously driven vehicle (one example of a travel-assisted vehicle; a host vehicle) in which travel route information generated by a recognition assessment processor is used, and for which drive, braking, steering, and a direction indicator light are autonomously controlled by selection of an autonomous driving mode. The configurations in the first embodiment are described below in each of "Overall System Configuration," "Control Block Configuration of Driving Assist Device," and "Process Configuration of Driving Assist Control."

An overall system configuration is described based on FIG. 1.

An autonomous driving system AD is provided with an onboard sensor 1, a map data storage part 2, a recognition assessment processor 3 (controller) for autonomous driving, an autonomous driving control part 4, an actuator 5, turn signals 6 (direction indicator lights), and a display device 7.

The onboard sensor 1 has a camera 11, a radar 12, a GPS 13, and an onboard data communicator 14. Sensor information acquired by the onboard sensor 1 is outputted to the recognition assessment processor 3.

The camera 11 is a surroundings recognition sensor that realizes a function of acquiring host vehicle surroundings information such as lanes, preceding vehicles, and pedestrians from image data, as a function needed for autonomous driving. The camera 11 is configured by combining, for example, a host vehicle forward recognition camera, a rearward recognition camera, a rightward recognition camera, a leftward recognition camera, etc.

Objects on the host vehicle travel roadway, lanes, objects outside of the host vehicle travel roadway (road structures, preceding vehicles, following vehicles, oncoming vehicles, surrounding vehicles, pedestrians, bicycles, motorcycles), the host vehicle travel roadway (white lines on the road, road borders, stop lines, crosswalks), road signs (speed limits), etc., are sensed by the camera 11.

The radar 12 is a distance measurement sensor that realizes a function of sensing the presence of objects in the surroundings of the host vehicle and the function of sensing distances to objects in the surroundings of the host vehicle, as functions needed for autonomous driving. "Radar 12" in this embodiment is a generic term including radar using radio waves, lidar using light, and sonar using ultrasonic waves. For example, laser radar, milliwave radar, ultrasonic radar, a laser range finder, etc., can be used as the radar 12. The radar 12 is configured by combining, for example, host vehicle forward radar, rearward radar, rightward radar, leftward radar, etc.

Positions of objects on the host vehicle travel roadway, objects outside of the host vehicle travel roadway (road structures, preceding vehicles, following vehicles, oncoming vehicles, surrounding vehicles, pedestrians, bicycles, motorcycles), etc., are sensed and distances to the objects are sensed by the radar 12. If viewing angle is insufficient, viewing angle may be increased as appropriate.

The GPS 13 is a host vehicle position sensor that has a GNSS antenna 13a and uses satellite communication to sense the host vehicle position (latitude and longitude) while the host vehicle is stopped or traveling. "GNSS" is an abbreviation of "Global Navigation Satellite System," and "GPS" is an abbreviation of "Global Positioning System."

The onboard data communicator 14 is an external data sensor that wirelessly communicates with an external data communicator 8 via transceiver antennas 8a, 14a, and thereby acquires, from an external source, information that cannot be acquired from the host vehicle.

In cases where the external data communicator 8 is, for example, a data communicator installed in the other vehicle traveling in the vicinity of the host vehicle, the external data communicator 8 performs vehicle-to-vehicle communication between the host vehicle and the other vehicle. Among a variety of information held in the other vehicle, information needed by the host vehicle can be acquired via the vehicle-to-vehicle communication, by a request from the onboard data communicator 14.

In cases where the external data communicator 8 is, for example, a data communicator provided to infrastructure equipment, the external data communicator 8 performs vehicle-to-infrastructure communication between the host vehicle and the infrastructure equipment. Among a variety of information held in the infrastructure equipment, information needed by the host vehicle can be acquired via the vehicle-to-infrastructure communication by a request from the onboard data communicator 14. In cases where, e.g., there is information that map data saved in the map data storage part 2 lacks, or information changed from that in the map data, it is possible for the lacking information/changed information to be supplementarily provided. In addition, it is possible to acquire traffic information, such as congestion information or travel restriction information, pertaining to a target route on which the host vehicle is planned to travel.

The map data storage part 2 is configured from an onboard memory that contains "electronic map data," in which map information and latitude/longitude are associated. From the map data contained in the map data storage part 2, map data centered on the host vehicle position is sent to the recognition assessment processor 3 when the host vehicle position sensed by the GPS 13 is recognized as host vehicle position information by the recognition assessment processor 3.

The map data has road information associated with individual locations, the road information being defined by nodes and links that connect the nodes. The road information includes information specifying roads according to positions and areas of the roads, a road classification for each road, a road width of each road, and shape information of the roads. The road information includes intersection positions, directions to enter intersections, intersection classifications, and other information pertaining to intersections, stored in association with each piece of identifying information of the road links. The road information also includes road classification, road width, road shape, the possibility of advancing straight forward, a priority relationship pertaining to advancement, the possibility of passing other vehicles (possibility of entering an adjacent lane), speed limits, road signs, and other information pertaining to roads, stored in association with each piece of identifying information of the road links.

The recognition assessment processor 3 performs integrated processing on input information from the onboard sensor 1 or the map data storage part 2, and generates a target route (travel route), a target vehicle speed profile (including an acceleration profile and/or a deceleration profile), etc. The generated target route information and target vehicle speed profile information are outputted to the autonomous driving control part 4 together with the host vehicle position information, etc. Specifically, a target route from a current location to a destination is generated based on the road information from the map data storage part 2, the technique by which the route is searched, etc., and the target vehicle speed profile, etc., along the target route is generated. Furthermore, when it has been assessed that autonomous driving cannot be maintained according to the result of the host vehicle surroundings being sensed by the onboard sensor 1 while the host vehicle is stopped or is traveling along the target route, the target route, the target vehicle speed profile, etc., are successively corrected based on the results from the sensing of the host vehicle surroundings. The target route is referred to as the target route even upon having been corrected. Specifically, the target route also includes a corrected route. Furthermore, the recognition assessment processor 3 performs control on the turn signals 6. Specifically, the recognition assessment processor 3 performs control that decides whether or not the turn signals 6 will be illuminated. In other words, the recognition assessment processor 3 performs control that either determines which of the turn signals 6 indicating the left and right directions will be illuminated, or determines that neither will be illuminated. The determined turn signal information is outputted to the autonomous driving control part 4.

The autonomous driving control part 4 computes, based on input information from the recognition assessment processor 3, a drive command value, a braking command value, or a steering angle command value that causes the host vehicle to travel or stop under autonomous driving along the target route. A result from the computing of the drive command value is outputted to a drive actuator 51, a result from the computing of the braking command value is outputted to a braking actuator 52, and a result from the computing of the steering command value is outputted to a steering angle actuator 53. Furthermore, the autonomous driving control part 4 outputs the turn signal information from the recognition assessment processor 3 to a turn signal actuator 54.

The actuator 5 is a control actuator that causes the host vehicle to travel or stop under autonomous driving along the target route, and the actuator 5 has the drive actuator 51, the braking actuator 52, and the steering angle actuator 53.

The drive actuator 51 is an actuator that receives input of a drive command value from the autonomous driving control part 4 and controls drive force outputted to drive wheels. As the drive actuator 51, for example, an engine is used in the case of an engine vehicle, an engine and a motor-generator (drive force) are used in the case of a hybrid vehicle, and a motor-generator (drive force) is used in the case of an electric automobile.

The braking actuator 52 is an actuator that receives input of a braking command value from the autonomous driving control part 4 and controls braking force outputted to the drive wheels. For example, a hydraulic booster, an electric booster, a brake fluid pressure actuator, a brake motor actuator, a motor-generator (regenerative), etc., is used as the braking actuator 52.

The steering angle actuator 53 is an actuator that receives input of a steering angle command value from the autonomous driving control part 4 and controls the steering angle of steered wheels. A turning motor, etc., provided to a steering force transmission system of a steering system is used as the steering angle actuator 53.

The turn signal actuator 54 receives input of turn signal information from the autonomous driving control part 4 and performs control on the turn signals 6. Specifically, the turn signal actuator 54 is an actuator that controls which of the turn signals 6 indicating the left and right directions will be illuminated, or controls the turn signals such that neither is illuminated. A turn signal solenoid, etc., is used as the turn signal actuator 54.

The turn signals 6 are direction indicator lights indicating the left and right directions. The illuminating and extinguishing of the turn signals 6 are controlled by the turn signal actuator 54. The turn signals 6 that are illuminated are a left turn signal and a right turn signal.

The display device 7 is a device that displays a screen image pertaining to, inter alia, where on a map the host vehicle is moving while the host vehicle is stopped or traveling under autonomous driving and provides visual information pertaining to the host vehicle position to a driver and/or a passenger. The display device 7 receives input of the target route information, the host vehicle position information, the destination information, etc., generated by the recognition assessment processor 3, and displays a map, roads, the target route (travel route of the host vehicle), the host vehicle position, the destination, etc., in a visually recognizable manner on the display screen image.

Figure 2:
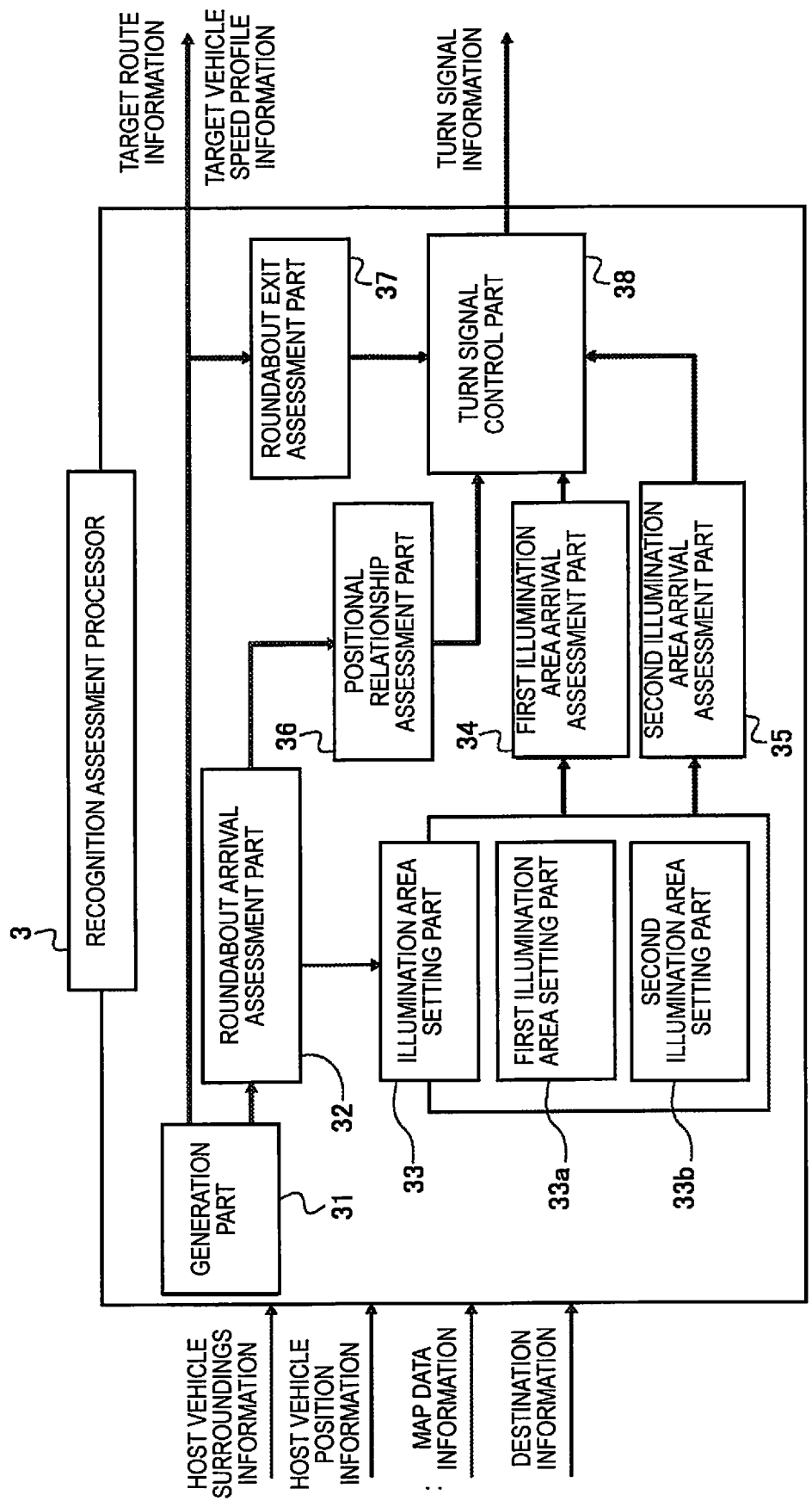
FIG. 2 is a control block diagram of a driving assist device provided to a recognition assessment processor.
Figure 3:
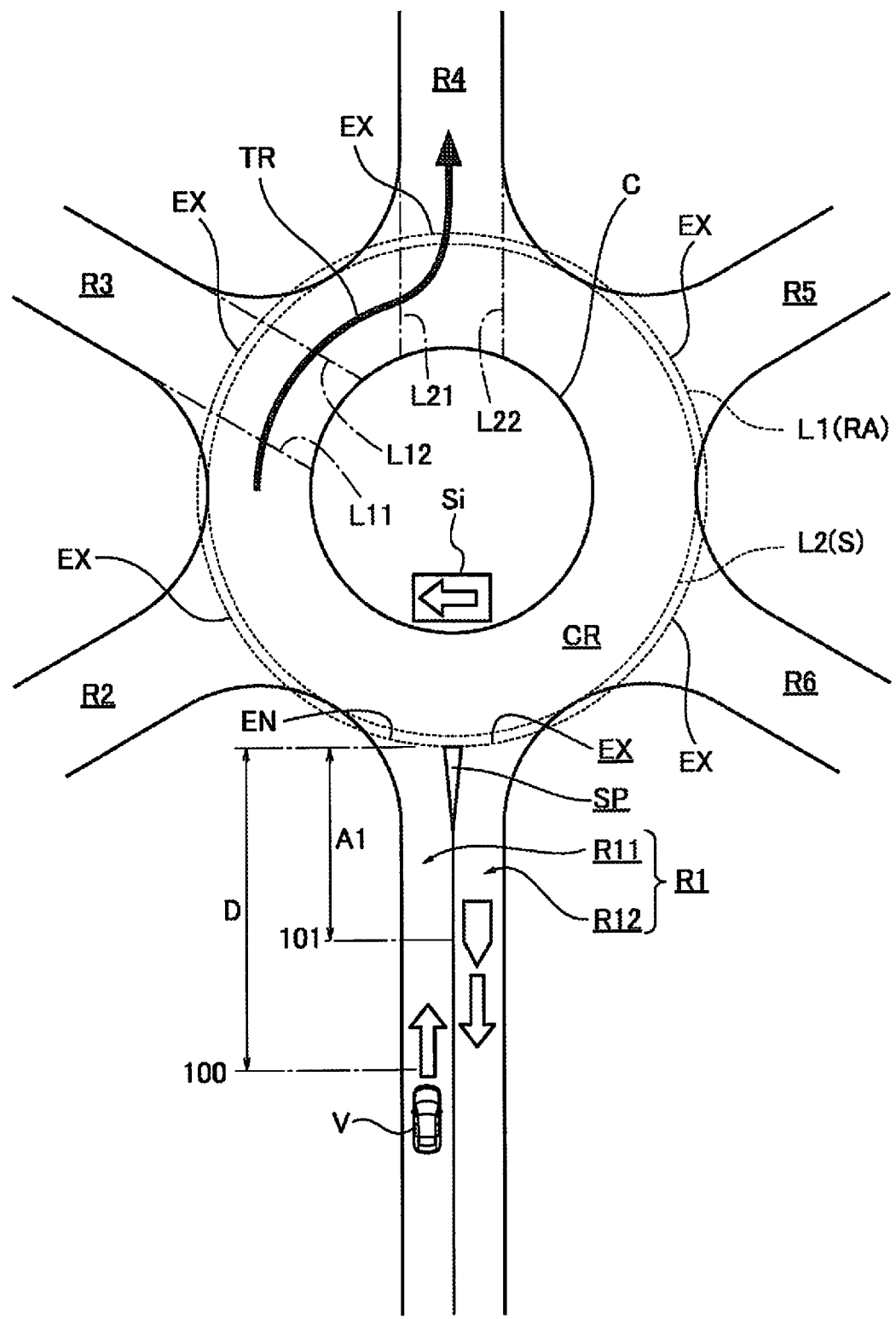
FIG. 3 is a schematic diagram of a roundabout.

A control block configuration of the driving assist device shall be described based on FIGS. 2 and 3.

The recognition assessment processor 3 is provided with a generation part 31, a roundabout arrival assessment part 32, and an illumination area setting part 33. The recognition assessment processor 3 further comprises a first illumination area arrival assessment part 34, a second illumination area arrival assessment part 35 (illumination area arrival assessment part), a positional relationship assessment part 36, a roundabout exit assessment part 37, and a turn signal control part 38 (direction indicator light control part).

The generation part 31 receives input of host vehicle surroundings information, host vehicle position information, map data information, and destination information, and generates a target route, a target vehicle speed profile, etc. The generated target route information and target vehicle speed profile information are outputted to the roundabout arrival assessment part 32, the roundabout exit assessment part 37, and the autonomous driving control part 4.

The roundabout arrival assessment part 32 receives input of the host vehicle position information, the map data information, and the target route information, assesses whether or not the host vehicle has arrived at a roundabout, and outputs an assessment result along with the target route information, etc., to the illumination area setting part 33 and the positional relationship assessment part 36. In the roundabout arrival assessment part 32, the assessment of whether or not the host vehicle has arrived at a roundabout assesses that the host vehicle V has arrived at a roundabout when the host vehicle has come within a prescribed distance of a roundabout.

A "roundabout RA" is an area enclosed by a round dashed line L1, as shown in FIG. 3. The term "roundabout RA" refers to a circular intersection in which three or more roads R1 to R6 are connected to a round space S (round dashed line L2). A central island C in the form of an island vehicle cannot pass through is provided in the center of the round space S, and a circular roadway (circulatory roadway) is provided around the surroundings of the central island C.

Vehicles pass one way in the circular roadway CR of the roundabout RA. In other words, the direction of rotation when passing through the circular roadway CR is either the right direction or the left direction. Specifically, in the case of left-side traffic as shown in FIG. 3, the direction of rotation when passing through the circular roadway CR is right-turning, and vehicles pass through the circular roadway CR while turning right (see FIGS. 6 to 10). A road sign Si is installed to indicate the direction of rotation when passing through the circular roadway CR as shown in FIG. 3. In the case of right-side traffic, the direction of rotation when passing through the circular roadway CR is left-turning, and vehicles pass through the circular roadway CR while turning left.

Furthermore, in the roundabout RA, vehicles traveling on the circular roadway CR have the right of way over vehicles about to enter the circular roadway CR, and vehicles about to enter the circular roadway CR therefore must not hinder the passage of vehicles traveling on the circular roadway CR.

In the roundabout RA of FIG. 3, six roads R1-R6 are connected to the circular roadway CR. In other words, the six roads R1-R6 are connected to each other via the circular roadway CR. Roads connected to the circular roadway CR are referred to below as "connecting roadways." The roundabout RA includes the central island C, the circular roadway CR, the connecting sections of the circular roadway CR and the connecting roadways R1-R6, and sections of the connecting roadways R1-R6. The borders of the round dashed line L1 and the connecting roadways R1-R6 are equivalent to exits and entrances of the connecting roadways R1-R6 and the roundabout RA.

When a first connecting roadway R1 has a first entry roadway R11 and a first exit roadway R12, a splitter island SP in the form of an island is provided between the first entry roadway R11 and the first exit roadway R12, as shown in FIG. 3. The first entry roadway R11 in this case is a road through which vehicles enter the roundabout RA. The first exit roadway R12 is a road through which vehicles exit the roundabout RA. The purpose of the splitter island SP is to split vehicles entering the roundabout RA and vehicles exiting the roundabout RA. When a splitter island SP is provided in this manner and, for example, a host vehicle entrance EN for the host vehicle V in the roundabout RA is the first entry roadway R11, a connecting roadway connected to a host vehicle exit EX for the host vehicle V in the roundabout RA is any one of the second through sixth connecting roadways R2-R6 and the first exit roadway R12. The splitter island SP provided to the first connecting roadway R1 was described, but splitter islands SP may also be provided to the second through sixth connecting roadways R2-R6 (see FIGS. 6 to 10).

The illumination area setting part 33 receives input of the assessment result of the roundabout arrival assessment part 32, the target route information, etc. When it is assessed by the roundabout arrival assessment part 32 that the host vehicle has arrived at a roundabout, the illumination area setting part 33, based on the target route information, sets an illumination area where a turn signal 6 will be illuminated. The illumination area setting part 33 comprises a first illumination area setting part 33*a* and a second illumination area setting part 33*b* (setting parts).

When it is assessed by the roundabout arrival assessment part 32 that the host vehicle has arrived at a roundabout, the first illumination area setting part 33*a*, based on the target route information, sets a first illumination area where a turn signal 6 is to be illuminated to indicate that the host vehicle is to enter the roundabout (entering illumination area). The first illumination area is an area before the host vehicle enters the roundabout. The first illumination area setting part 33*a* outputs the first illumination area along with the target route information, etc., to the first illumination area arrival assessment part 34.

When it is assessed by the roundabout arrival assessment part 32 that the host vehicle has arrived at a roundabout, the second illumination area setting part 33*b*, based on the target route information, sets a second illumination area where a turn signal 6 is to be illuminated to indicate that the host vehicle is to exit the roundabout (exiting illumination area). There are times when a second illumination area is set from the positional relationship between the host vehicle entrance and the host vehicle exit in the roundabout based on the target route information, and times when a second illumination area is not set. A second illumination area is set when the host vehicle exit is the exit after the first exit following the entry into the roundabout. At this time, the second illumination area is set between a transitory position where the host vehicle passes the exit that immediately precedes the host vehicle exit, and a proximate position that is close to the host vehicle exit. A second illumination area is not set when the direction indicated by the turn signal 6 illuminated when the host vehicle enters the roundabout is opposite of the direction of rotation when passing through the roundabout, and the host vehicle exit is the first exit following entry into the roundabout. The second illumination area setting part 33*b* outputs the second illumination area along with the target route information to the second illumination area arrival assessment part 35.

The first illumination area arrival assessment part 34 receives input of the first illumination area of the first illumination area setting part 33*a*, the host vehicle position information, and the target route information. The first illumination area arrival assessment part 34 assesses whether or not the host vehicle has arrived at the first illumination area while the host vehicle is traveling on a connecting roadway connected to the roundabout. The first illumination area arrival assessment part 34 outputs the assessment result along with the host vehicle position information and the target route information to the turn signal control part 38. In the first illumination area arrival assessment part 34, the assessment of whether or not the host vehicle has arrived at the first illumination area is assessed according to a drive distance ratio.

The second illumination area arrival assessment part 35 receives input of the second illumination area of the second illumination area setting part 33*b*, the host vehicle position information, and the target route information. The second illumination area arrival assessment part 35 assesses whether or not the host vehicle has arrived at the second illumination area while the host vehicle is traveling on the roundabout. The second illumination area arrival assessment part 35 then outputs the assessment result along with the host vehicle position information and the target route information to the turn signal control part 38. In the second illumination area arrival assessment part 35, the assessment of whether or not the host vehicle has arrived at the second illumination area is assessed according to a drive distance ratio.

The positional relationship assessment part 36 receives input of the assessment result of the roundabout arrival assessment part 32, the target route information, etc. When the roundabout arrival assessment part 32 assesses that the host vehicle has arrived at the roundabout, the positional relationship assessment part 36 assesses the positional relationship between the host vehicle entrance and the host vehicle exit in the roundabout based on the host vehicle position information and the target route information. The positional relationship assessment part 36 then outputs an assessment result along with the target route information, etc., to the turn signal control part 38. The positional relationship is assessed from a relative angle between the host vehicle entrance and the host vehicle exit.

The roundabout exit assessment part 37 receives input of the host vehicle position information, the map data information, and the target route information, assesses whether or not the host vehicle has exited the roundabout, and outputs an assessment result along with the target route information, etc., to the turn signal control part 38.

The turn signal control part 38 receives input of the assessment results of the assessment parts 34-37, the target route information, etc., and performs control of the turn signals 6. Specifically, the turn signal control part 38 performs control that determines which of the turn signals 6 indicating the left and right directions to illuminate and which to not illuminate. Not illuminating either of the turn signals 6 indicating the left and right directions is a state in which the left turn signal and the right turn signal are both extinguished.

When the host vehicle enters a roundabout and the first illumination area arrival assessment part 34 assesses that the host vehicle has arrived at a first illumination area, the turn signal control part 38 performs control that determines the direction to be indicated by the turn signals 6 in accordance with the positional relationship that was assessed of the positional relationship assessment part 36. The turn signal control part 38 then outputs the determined direction indicated by the turn signals 6 as turn signal information to the autonomous driving control part 4. The turn signal control part 38 also outputs a determination that neither of the turn signals 6 indicating the left and right directions will be illuminated as turn signal information to the autonomous driving control part 4.

From the host vehicle entrance until the host vehicle exits the roundabout, the turn signal control part 38 successively compares the current positional relationship between the current position of the host vehicle and the host vehicle exit, and assesses whether or not a switching condition to switch the direction indicated by the turn signals 6 has been fulfilled. Furthermore, when the switching condition has been fulfilled, the turn signal control part 38 switches the direction indicated by the turn signals 6 based on the switching condition. The turn signal control part 38 then outputs the switched direction indicated by the turn signals 6 as turn signal information to the autonomous driving control part 4.

In the following two situations, the turn signal control part 38 extinguishes the left turn signal after the host vehicle has entered the roundabout. One is that the direction indicated by the direction indicator light when the host vehicle enters the roundabout is opposite of the direction of rotation when the host vehicle passes through the roundabout. The other is that the host vehicle exit is the exit after the first exit following entry into the roundabout.

When the host vehicle exits the roundabout and the second illumination area arrival assessment part 35 assesses that the host vehicle has arrived at a second illumination area, the turn signal control part 38 performs control that determines to illuminate the turn signal 6 that would indicate the host vehicle is exiting the roundabout. The direction of the turn signal 6 that would indicate the host vehicle is exiting the roundabout, i.e., the direction indicated by the final illuminated turn signal 6 is opposite of the direction of rotation when the host vehicle is passing through the roundabout. The turn signal control part 38 outputs the direction indicated by the determined turn signal 6 as turn signal information to the autonomous driving control part 4.

When the roundabout exit assessment part 37 assesses that the host vehicle has exited the roundabout, the turn signal control part 38 performs control that determines to extinguish the turn signal 6. The turn signal control part 38 then outputs the extinguishing of the turn signal 6 as turn signal information to the autonomous driving control part 4.

Figure 4:
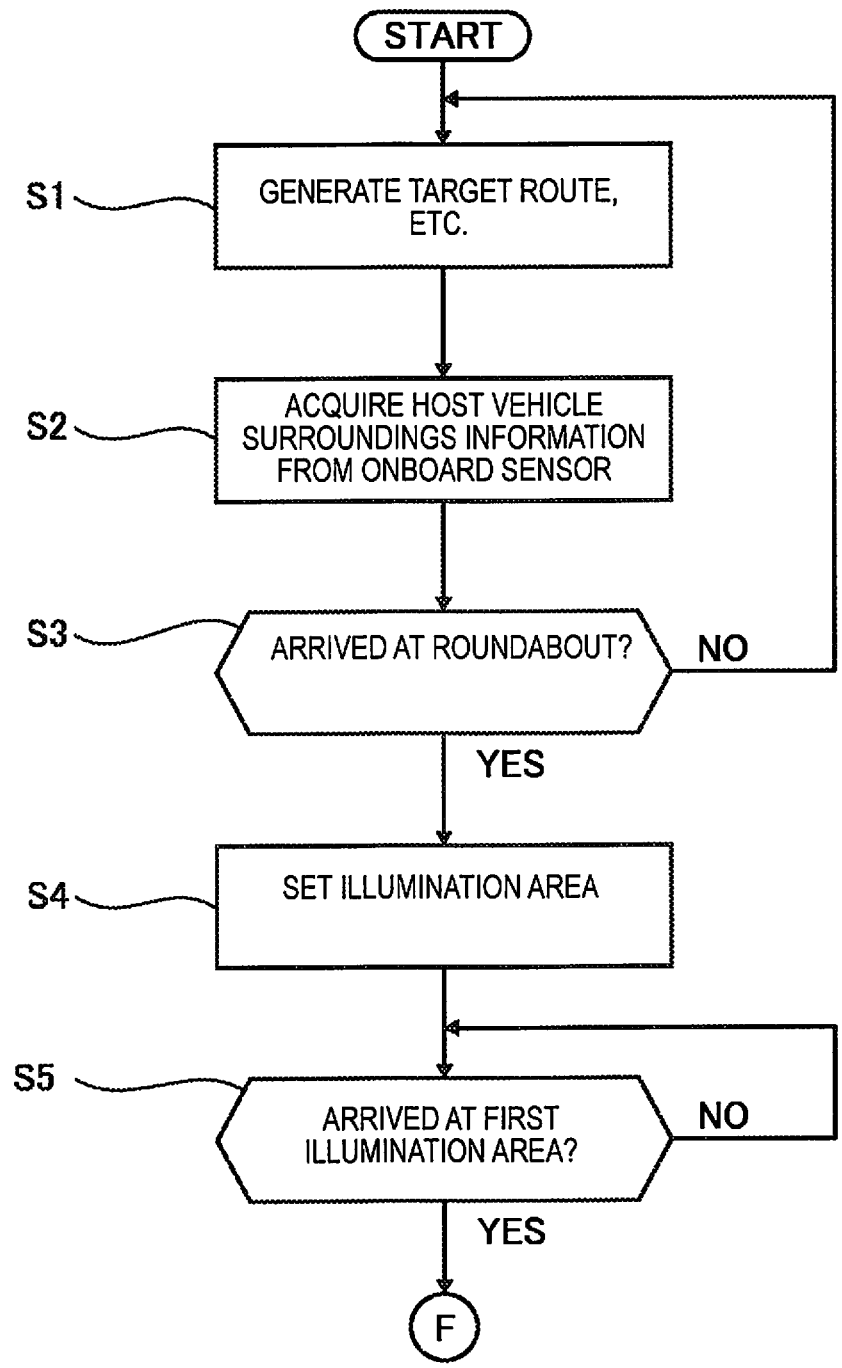
FIG. 4 is a first flowchart of an overall flow of a driving assist control process executed by the driving assist device provided to the recognition assessment processor.
Figure 5:
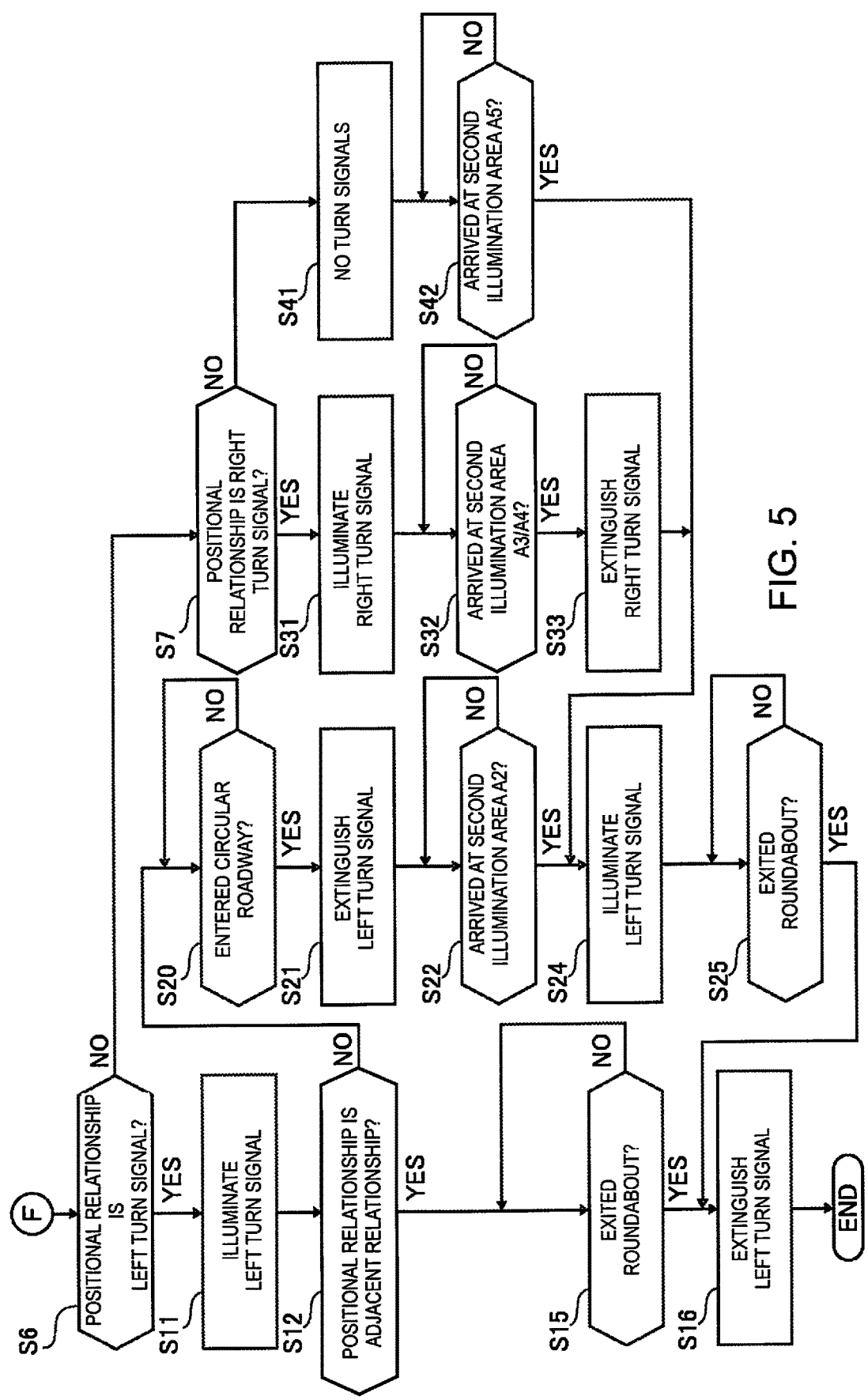
FIG. 5 is a second flowchart of the overall flow of the driving assist control process executed by the driving assist device provided to the recognition assessment processor.

A process configuration of driving assist control shall be described based on FIGS. 3 to 11. Steps of the process control of FIGS. 4 and 5 are described below.

In step S1, necessary information depending on host vehicle surroundings information, host vehicle position information, map data information, destination information, etc., is acquired, a target route, etc., is generated and the process advances to step S2. Step S1 corresponds to the generation part 31.

In step S2, in continuation from the generation of the target route, etc., in step S1, host vehicle surroundings information and host vehicle position information are acquired from the onboard sensor 1 while the host vehicle is traveling and the process advances to step S3.

In step S3, in continuation from the acquisition of the host vehicle surroundings information and the host vehicle position information in step S2, an assessment is made as to whether or not the host vehicle has arrived at a roundabout RA. When the assessment is YES (the host vehicle has arrived at a roundabout), the process advances to step S4, and when the assessment is NO (the host vehicle has not arrived at a roundabout), the process returns to step S1. Step S3 corresponds to the roundabout arrival assessment part 32.

"Whether or not the host vehicle has arrived at a roundabout RA" is an assessment that the host vehicle V has arrived at a roundabout RA when the host vehicle V has come within a prescribed distance D of a roundabout RA. The "prescribed distance D" is a distance from the roundabout RA to a prescribed position 100 as shown in FIG. 3; for example, the prescribed distance is 50 m. Whether or not the host vehicle V has come within a prescribed distance D of the roundabout RA is assessed based on the host vehicle position information, etc.

In step S4, in continuation from the assessment that the host vehicle has arrived at a roundabout in step S3, a first illumination area and a second illumination area are set and the process advances to step S5. Step S4 corresponds to the illumination area setting part 33. Specifically, step S4 corresponds to the first illumination area setting part 33a and the second illumination area setting part 33b.

In this example, a "first illumination area A1" is set between the roundabout RA and a first illumination position 101, as shown in FIG. 3. The distance from the roundabout RA to the first illumination position 101 is set to, for example, 30 m.

Next, the "second illumination area" shall be described based on FIGS. 6 to 10. The second illumination area is changed depending on the map data information and the target route; therefore, for the sake of convenience, the second illumination area is classified depending on whether the host vehicle is making a left turn, a first right turn, or a second right turn, or advancing straight.

Figure 6:
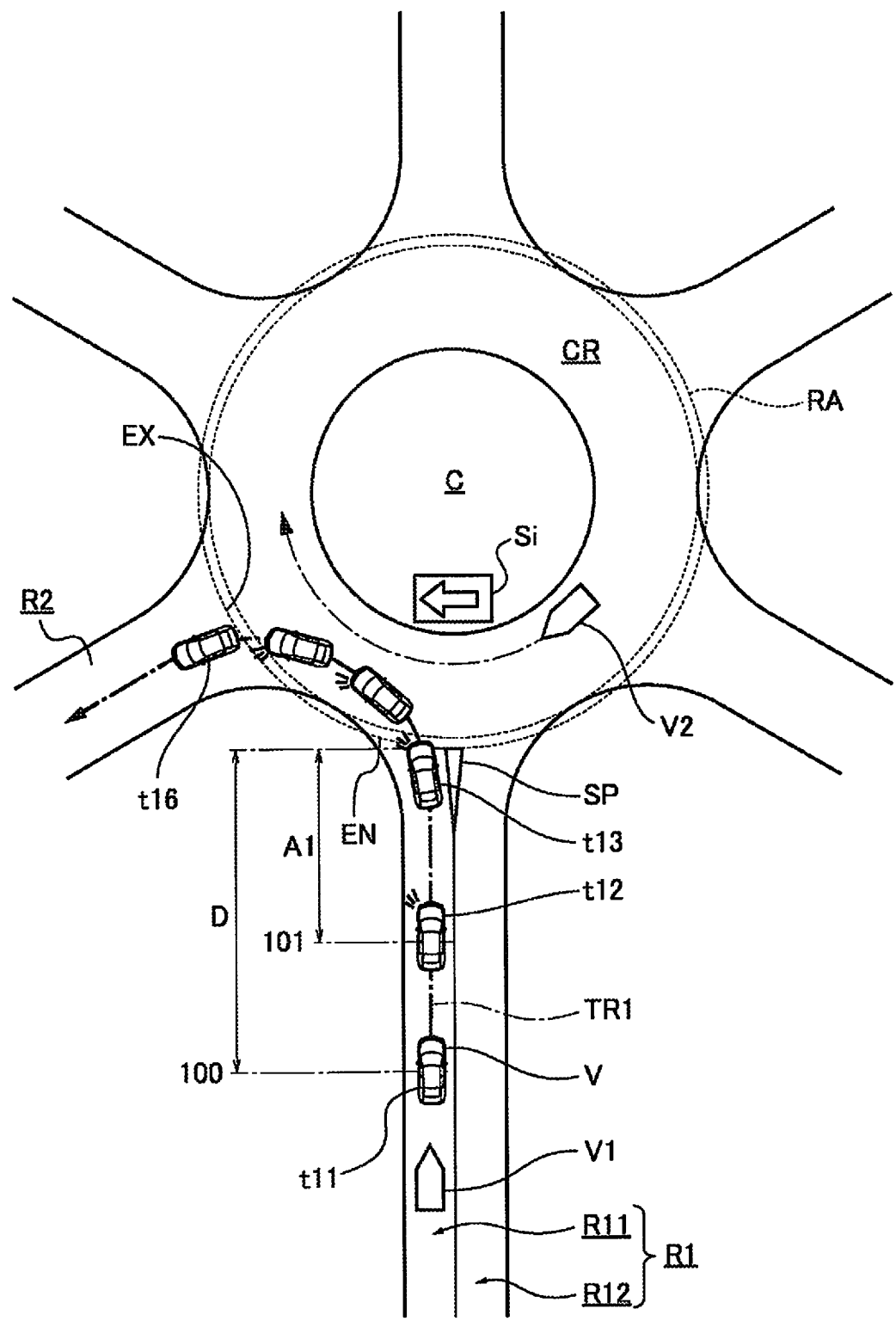
FIG. 6 is a schematic diagram of a driving assist control action and the operation of the host vehicle on a first target route.

First, in a first target route TR1 shown in FIG. 6, a host vehicle exit EX is the first exit, and this route is therefore appropriate to a time when a second illumination area is not set. Therefore, a second illumination area is not set in the first target route TR1.

Figure 7:
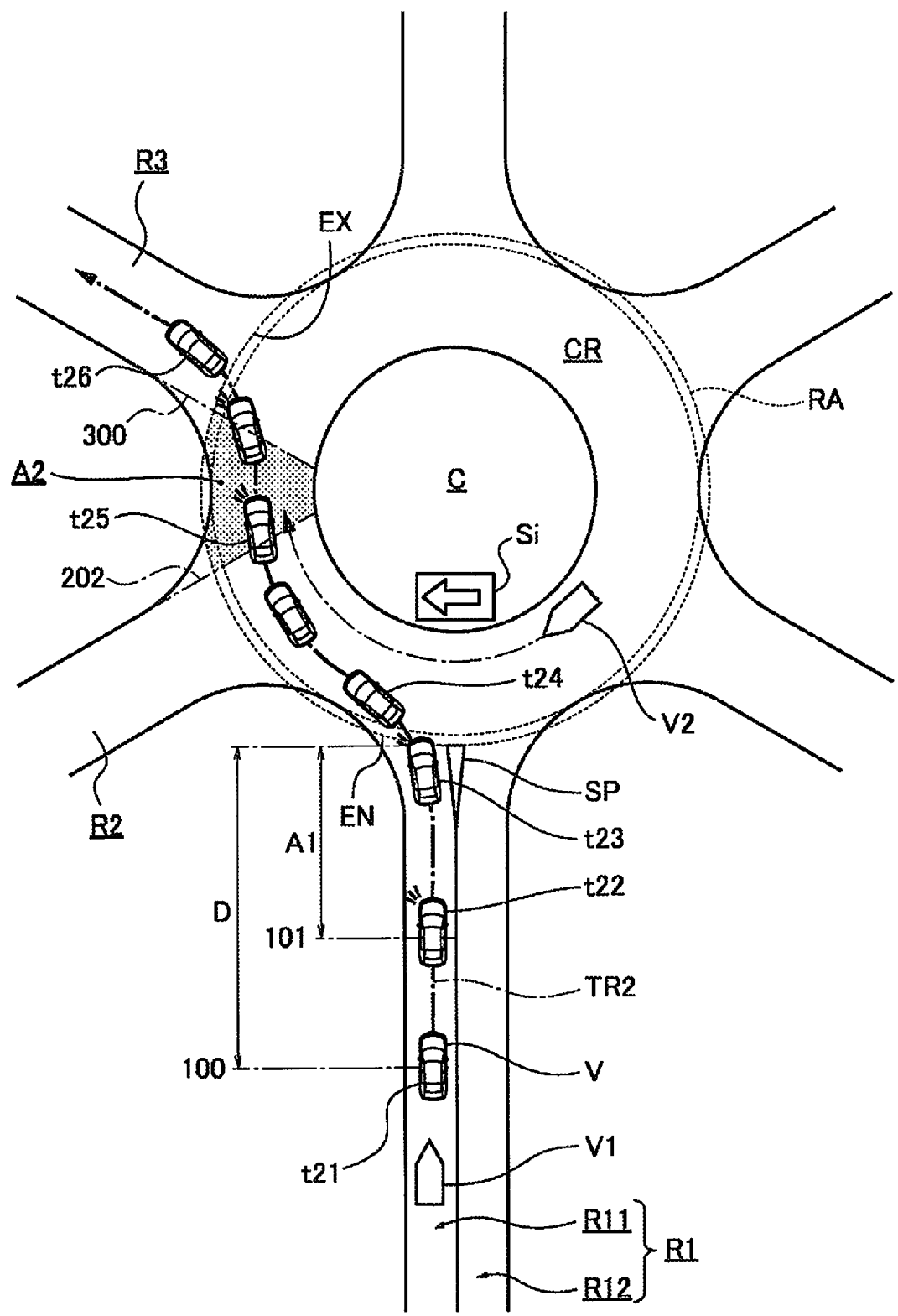
FIG. 7 is a schematic diagram of a second illumination area, a driving assist control action, and the operation of the host vehicle on a second target route.
Figure 10:
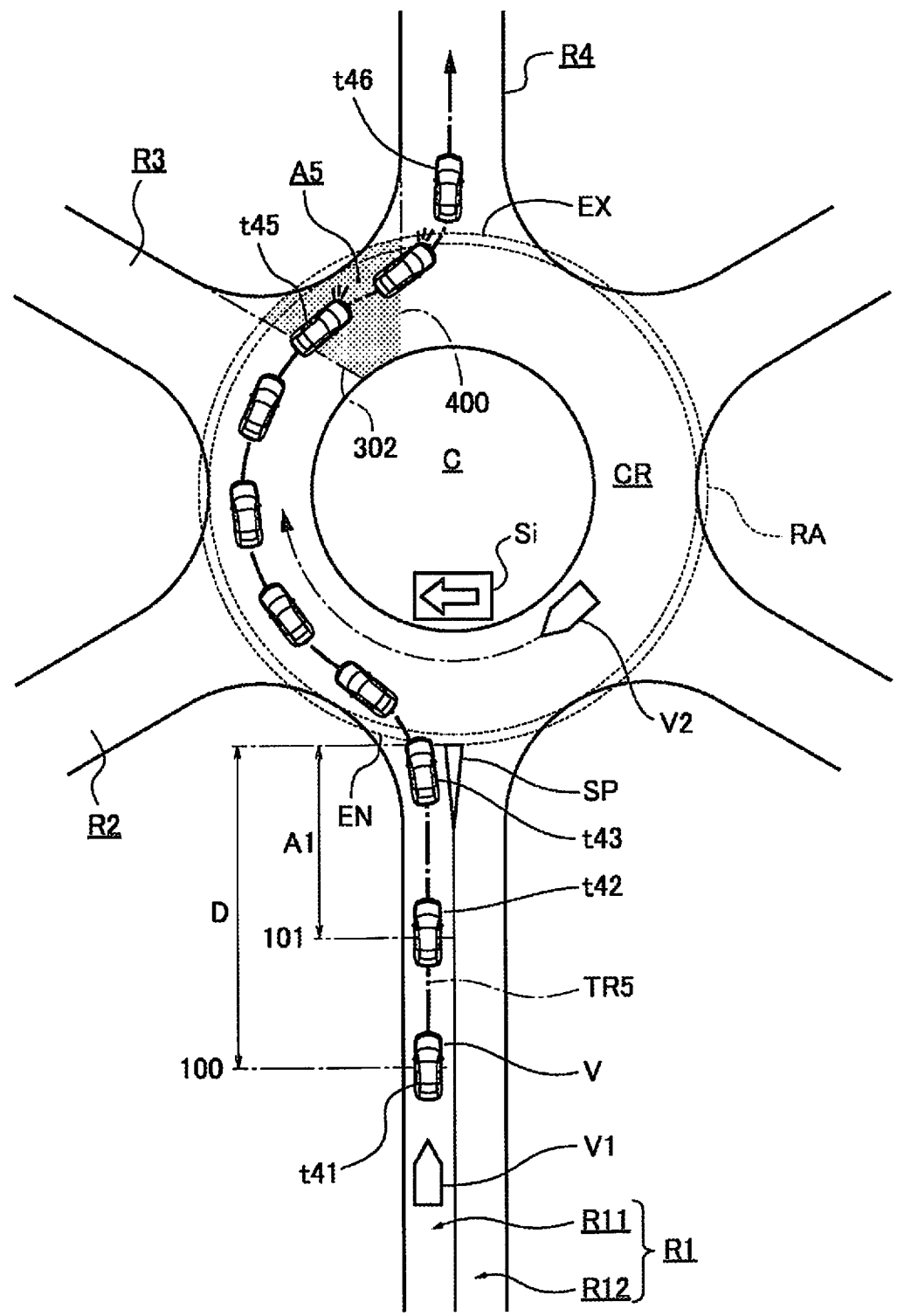
FIG. 10 is a schematic diagram of a second illumination area, a driving assist control action, and the operation of the host vehicle on a fifth target route.

In a second target route TR2 shown in FIG. 7 through to a fifth target route TR5 of FIG. 10, the host vehicle exit EX is an exit after the first exit, and these routes are therefore appropriate to a time when a second illumination area is set. Therefore, a second illumination area is set in the second through fifth target routes TR2 to TR5. The second illumination area is set to an area extending from a transitory position where the host vehicle passes the exit (connecting roadway) that immediately precedes the host vehicle exit EX to a proximate position that is close to the host vehicle exit EX (connecting roadway).

The "transitory position" shall be described here. First, a straight section of the connecting roadway connected to the immediately preceding exit (referred to below also as the "immediately preceding connecting road" is extended to the roundabout RA, and two extending lines are set on the circular roadway CR. Of the intersecting positions between the two extending lines and the target route of the host vehicle V, the intersecting position farther away in the target route of the host vehicle V is designated as the transitory position. The "proximate" position shall be described. First, a straight section of the connecting roadway connected to the host vehicle exit (referred to below also as the "host vehicle exit connecting road") is extended to the roundabout RA, and two extending lines are set on the circular roadway CR. Of the two extending lines, intersecting positions where the lines intersect with the target route of the host vehicle V are designated as proximate positions. In other words, of the intersecting positions between the two extending lines and the target route of the host vehicle V, the nearer intersecting position in the target route of the host vehicle V is designated as the proximate position. For a case in which the connecting roadway splits into a road entering the roundabout and a road exiting the roundabout, only matters that differ from the above are described. When the immediately preceding connecting roadway splits, the straight section of the exit roadway is extended to the roundabout RA and two extending lines are set on the circular roadway CR. When the host vehicle exit connecting roadway splits, the straight section of the exit roadway is extended to the roundabout RA and two extending lines are set on the circular roadway CR.

A specific example of a transitory position and a proximate position is described based on FIG. 3. The description relating to FIG. 3 is of a case in which the connecting roadway of the immediately preceding exit is designated as a third connecting roadway R3, the connecting roadway of the host vehicle exit is designated as a fourth connecting roadway R4, and the target route is designated as a target route TR. In this case, the transitory position is first described. A straight section of the third connecting roadway R3 is extended to the roundabout RA, and two extending lines L11, L12 are set on the circular roadway CR. Of the intersecting positions between the two extending lines L11, L12 and the target route TR of the host vehicle V, the intersecting position (extending line L12) farther away in the target route TR of the host vehicle V is designated as the transitory position. Next, the proximate position is described. A straight section of the fourth connecting roadway R4 is extended to the roundabout RA, and two extending lines L21, L22 are set on the circular roadway CR. Of the two extending lines L21, L22, an intersecting position (extending line L21) that intersects the target route TR of the host vehicle V is designated as the proximate position. The target route TR does not intersect the extending line L22 as shown in FIG. 3. The second illumination areas in the second target route TR2 shown in FIG. 7 through to the fifth target route TR5 of FIG. 10 are each described.

First, in the second target route TR2 shown in FIG. 7, a left-turn second illumination area A2 (the area filled in with dots) is set. Based on the second target route TR2 shown in FIG. 7, the left-turn second illumination area A2 is set from a second transitory position 202, which is where the host vehicle V passes the second connecting roadway R2 immediately preceding the host vehicle exit EX, to a third proximate position 300, which is close to the third connecting roadway R3 of the host vehicle exit EX.

Figure 8:
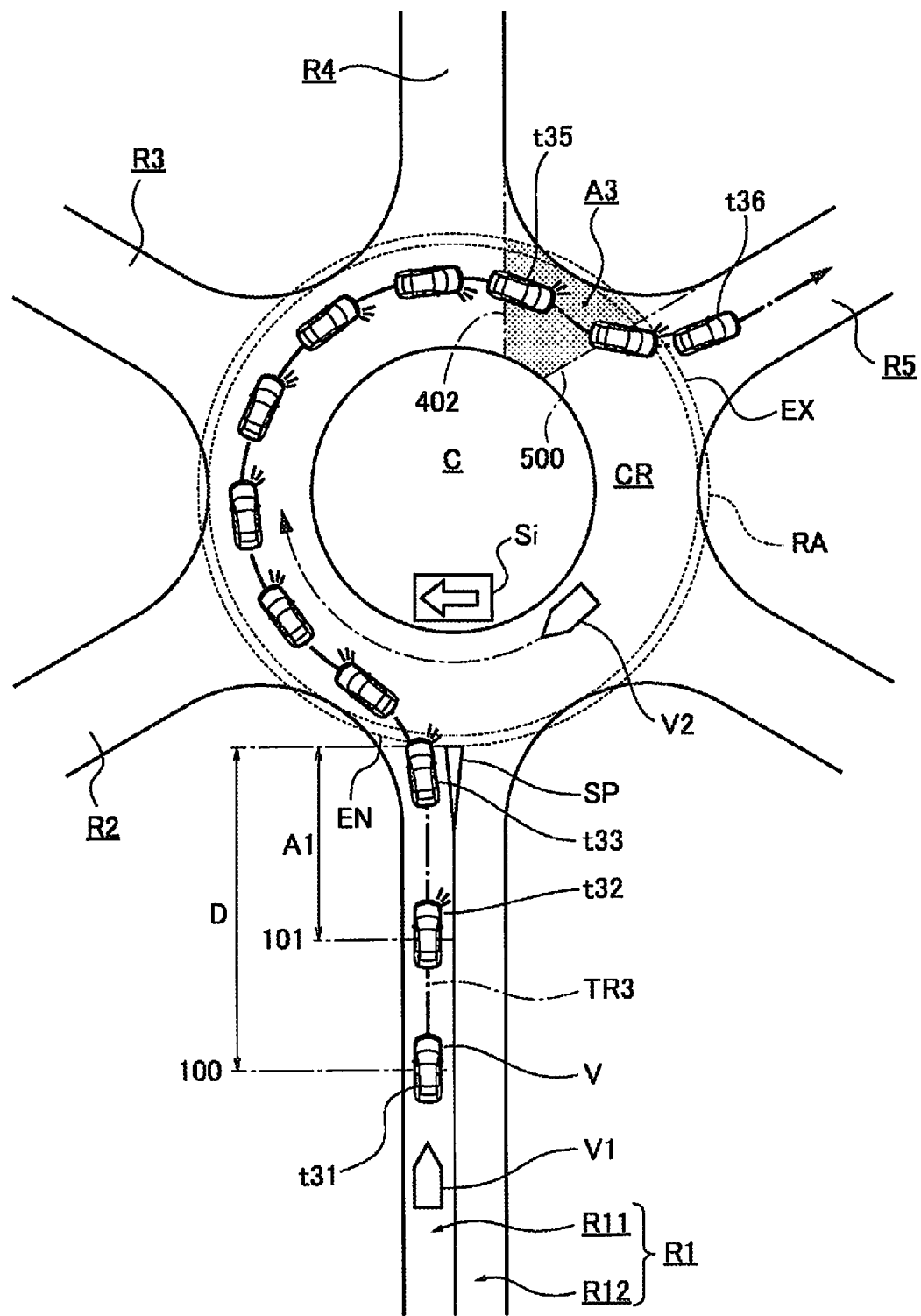
FIG. 8 is a schematic diagram of a second illumination area, a driving assist control action, and the operation of the host vehicle on a third target route.

Next, in the third target route TR3 shown in FIG. 8, a first-right-turn second illumination area A3 (the area filled in with dots) is set. In the third target route TR3 shown in FIG. 8, the fourth connecting roadway R4 immediately preceding the host vehicle exit EX is a one-way road where vehicles only enter the fourth connecting roadway R4 from the roundabout RA. Based on the third target route TR3 shown in FIG. 8, the first-right-turn second illumination area A3 is set from a fourth transitory position 402, which is where the host vehicle V passes the fourth connecting roadway R4 immediately preceding the host vehicle exit EX, to a fifth proximate position 500, which is close to the fifth connecting roadway R5 of the host vehicle exit EX.

Figure 9:
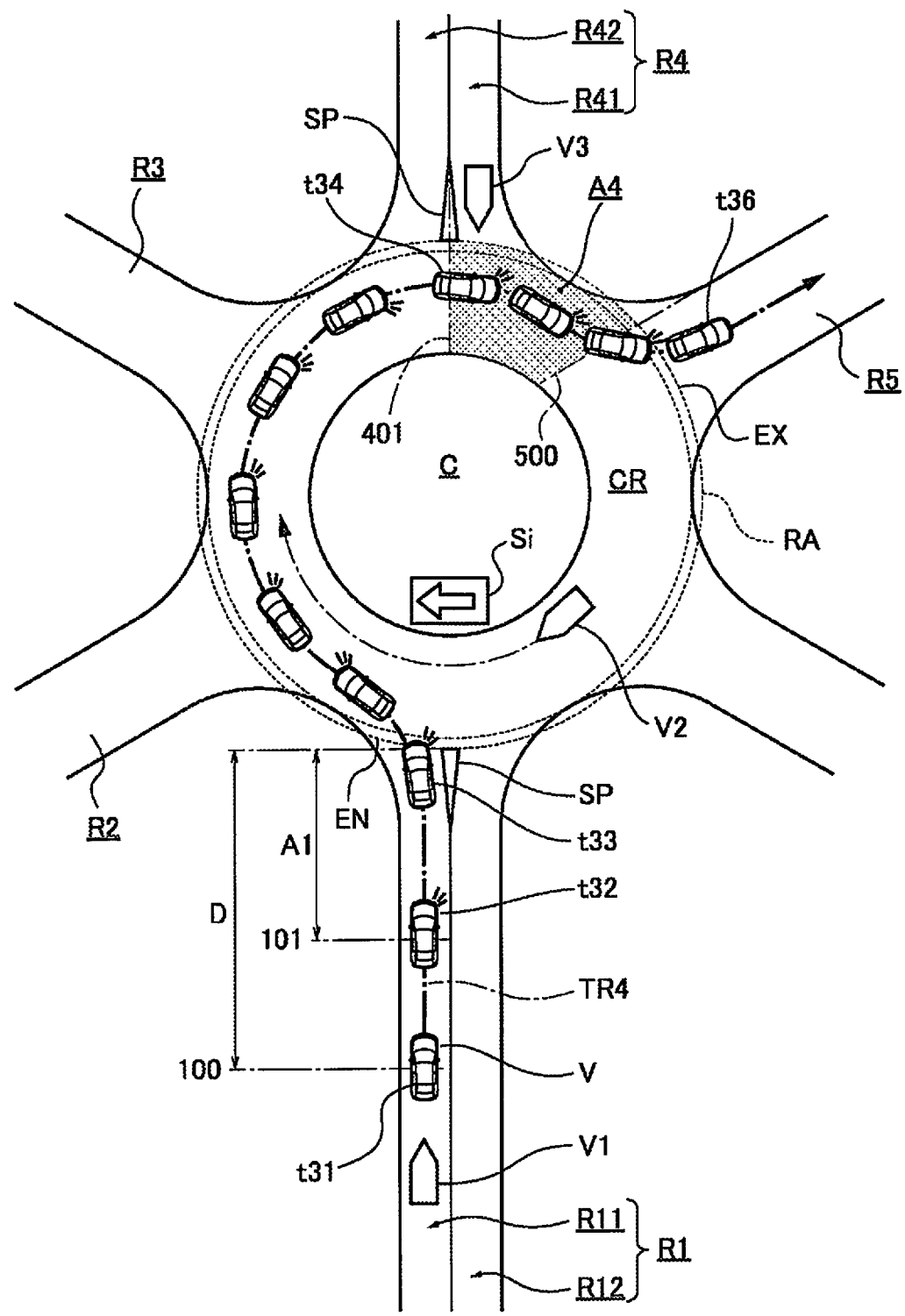
FIG. 9 is a schematic diagram of a second illumination area, a driving assist control action, and the operation of the host vehicle on a fourth target route.

Next, in the fourth target route TR4 shown in FIG. 9, a second-right-turn second illumination area A4 (the area filled in with dots) is set. In the fourth target route TR4 shown in FIG. 9, the fourth connecting roadway R4 immediately preceding the host vehicle exit EX has a fourth entry roadway R41 and a fourth exit roadway R42. In this example, the fourth entry roadway R41 is a road where vehicles enter the roundabout RA from the fourth connecting roadway R4. The fourth exit roadway R42 is a road where vehicles exit the roundabout RA to the fourth connecting roadway R4. Therefore, the fourth entry roadway R41 is a road where it is possible for other vehicles to enter the roundabout RA from the fourth entry roadway R41. Based on the fourth target route TR4 shown in FIG. 9, the second-right-turn second illumination area A4 is set from a fourth splitting position 401 (transitory position), where the host vehicle V passes the fourth exit roadway R42 immediately preceding the host vehicle exit EX, to a fifth proximate position 500, which is close to the fifth connecting roadway R5 of the host vehicle exit EX.

Next, in the fifth target route TR5 shown in FIG. 10, a straight-advance second illumination area A5 (the area filled in with dots) is set. Based on the fifth target route TR5 shown in FIG. 10, the straight-advance second illumination area A5 is set from a third transitory position 302, where the host vehicle V passes the third connecting roadway R3 immediately preceding the host vehicle exit EX, to a fourth proximate position 400, which is close to the fourth connecting roadway R4 of the host vehicle exit EX.

A second illumination area is similarly set also when the connecting roadway connected to the host vehicle exit EX is the sixth connecting roadway R6 or the first exit roadway R12.

In step S5, in continuation from the setting of the first illumination area A1 and the second illumination areas A2-A5 in step S4, an assessment is made as to whether or not the host vehicle V has arrived at the first illumination area A1. When the assessment is YES (the host vehicle has arrived at the first illumination area A1), the process advances to step S6, and when the assessment is NO (the host vehicle has not arrived at the first illumination area A1), the flow of step S5 is repeated. Step S5 corresponds to the first illumination area arrival assessment part 34.

In this example, "whether or not the host vehicle V has arrived at the first illumination area A1" is assessed according to a drive distance ratio. Specifically, "whether or not the host vehicle V has arrived at the first illumination area A1" is assessed according to a ratio between the prescribed distance D (50 m) and a drive distance (a variable) from the prescribed position 100 to the host vehicle position (see FIG. 3). For example, when the drive distance ratio is 0.4 to 1.0 (inclusive), it is assessed that the host vehicle V has arrived at the first illumination area A1.

In step S6, in continuation from the assessment that the host vehicle has arrived at the first illumination area A1 in step S5, the positional relationship between the host vehicle entrance EN and the host vehicle exit EX in the roundabout RA is assessed based on the target route information. An assessment is then made in step S6 as to whether or not the positional relationship of the exit and entrance is a condition for illuminating a turn signal. When the assessment is YES (a left turn signal illumination condition is fulfilled), the process advances to step S11, and when the assessment is NO (the left turn signal illumination condition is not fulfilled), the process advances to step S7. The left turn signal illumination condition is described hereinafter. Additionally, step S6 corresponds to the positional relationship assessment part 36.

In step S7, in continuation from the assessment that the left turn signal illumination condition is not fulfilled in step S6, the positional relationship between the host vehicle entrance EN and the host vehicle exit EX in the roundabout RA is assessed based on the target route information. An assessment is then made in step S7 as to whether or not the positional relationship of the exit and entrance is a condition for illuminating the right turn signal. When the assessment is YES (a right turn signal illumination condition is fulfilled), the process advances to step S31, and when the assessment is NO (the right turn signal illumination condition is not fulfilled), the process advances to step S41. Step S7 corresponds to the positional relationship assessment part 36.

Figure 11:
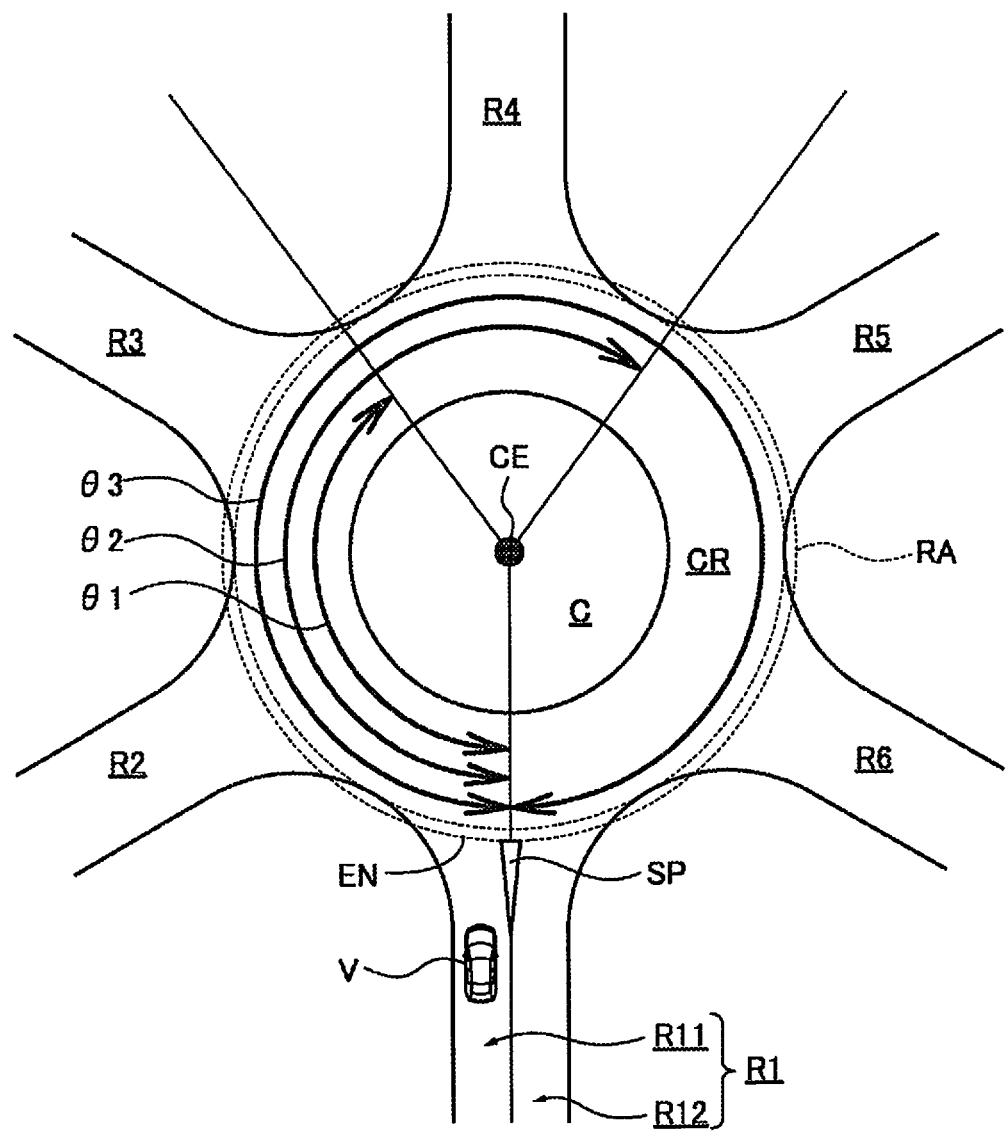
FIG. 11 is a schematic diagram of an assessment of a positional relationship, according to relative angle, between a host vehicle entrance and a host vehicle exit.

In this example, the assessment of the positional relationship of the host vehicle entrance EN and the host vehicle exit EX in step S6 and step S7 is described based on FIG. 11. The positional relationship is assessed from a relative angle θ between the host vehicle entrance EN and the host vehicle exit EX. The relative angle θ is described in terms of a roundabout RA in which six roads R1-R6 are connected to a circular roadway CR, such as is shown in FIG. 11. The relative angle θ is computed from the positions of the host vehicle entrance EN and the host vehicle exit EX as seen from a center CE of the roundabout RA. When the entire host vehicle exit (the borders of the round dashed line L1 and the connecting roadway) is within the relative angle θ, the positional relationship corresponds to the following conditions. Therefore, the host vehicle entrance is designated as zero degrees. In the description pertaining to FIG. 11, the first entry roadway R11, which is the host vehicle entrance EN, is at zero degrees.

When the relative angle θ is greater than zero degrees and equal to or less than a first angle θ1 (e.g., 144 degrees), the positional relationship of the exit and entrance corresponds to a condition for illuminating the left turn signal. In FIG. 11, when the connecting roadway connected to the host vehicle exit EX is the second connecting roadway R2 or the third connecting roadway R3, the positional relationship corresponds to a condition for illuminating the left turn signal. At this time, the left turn signal illumination condition is assessed [to be fulfilled] in step S6.

When the relative angle θ is greater than the first angle θ1 and equal to or less than a second angle θ2 (e.g., 216 degrees), the positional relationship of the exit and entrance corresponds to a condition for illuminating neither of the turn signals 6 indicating the left and right directions. In FIG. 11, when the connecting roadway connected to the host vehicle exit EX is the fourth connecting roadway R4, the positional relationship corresponds to a condition for illuminating neither of the turn signals 6 indicating the left and right directions. At this time, the left turn signal illumination condition is assessed to not be fulfilled in step S6, and the right turn signal illumination condition is assessed to not be fulfilled in step S7. When, for example, it is the third connecting roadway R3 that is connected to the host vehicle exit EX and a section of the host vehicle exit EX at this time is within the range "θ1<relative angle ≤θ2," the third connecting roadway R3 corresponds to a condition for illuminating neither of the turn signals 6 indicating the left and right directions.

When the relative angle θ is greater than the second angle θ2 and equal to or less than a third angle θ3 (e.g., 360 degrees), the positional relationship of the exit and entrance corresponds to a condition for illuminating the right turn signal. In FIG. 11, when the connecting roadway connected to the host vehicle exit EX is the fifth connecting roadway R5, the sixth connecting roadway R6, or the first exit roadway R12, the positional relationship corresponds to a condition for illuminating neither of the turn signals 6 indicating the left and right directions. At this time, the left turn signal illumination condition is assessed to not be fulfilled in step S6, and the right turn signal illumination condition is assessed to be fulfilled in step S7. A time "when the host vehicle exit EX is the first exit roadway R12" corresponds to a time when the host vehicle V is turning all the way around. When, for example, it is the fourth connecting roadway R4 that is connected to the host vehicle exit EX and a section of the host vehicle exit EX at this time is within the range "θ2<relative angle ≤θ3," the fourth connecting roadway R4 corresponds to a condition for illuminating the right turn signal.

In step S11, in continuation from the assessment that the left turn signal illumination condition is fulfilled in step S6, control that determines to illuminate the left turn signal is performed and the process advances to step S12. The left turn signal is thereby illuminated from a turn-signal-extinguished state. The term "turn-signal-extinguished state" refers to a state in which neither of the turn signals 6 indicating the left and right directions is illuminated. Steps S11, S16, S20, S21, S24, S31, S33, and S41 correspond to the turn signal control part 38.

In step S12, in continuation from the determination to illuminate the left turn signal in step S11, the positional relationship of the host vehicle entrance EN and the host vehicle exit EX in the roundabout is assessed based on the target route information, and whether or not the positional relationship of the exit and entrance is an adjacent relationship is assessed. When the assessment is YES (an adjacent relationship), the process advances to step S1, and when the assessment is NO (not an adjacent relationship), the process advances to step S20. Step S12 corresponds to the positional relationship assessment part 36.

The phrase "the positional relationship of the exit and entrance is an adjacent relationship" refers to a time when, for example, in FIG. 11, the host vehicle entrance EN is the first connecting roadway R1 and the connecting roadway connected to the host vehicle exit EX is the second connecting roadway R2. In other words, when the host vehicle V travels as shown in FIG. 6, the positional relationship of the exit and entrance is assessed to be an adjacent relationship. Due to the assessment of step S6 being negative, when the host vehicle entrance EN is the first entry roadway R11 and the connecting roadway connected to the host vehicle exit EX is the sixth connecting roadway R6 or the first exit roadway R12 in FIG. 11, the positional relationship of the exit and entrance is not assessed to be an adjacent relationship.

In step S15, in continuation from the assessment that the positional relationship is an adjacent relationship in step S12, whether or not the host vehicle V has exited the roundabout RA is assessed. When the assessment is YES (host vehicle has exited), the process advances to step S16, and when the assessment is NO (host vehicle has not exited), step S15 is repeated. Step S15 corresponds to the roundabout exit assessment part 37.

In this example, "whether or not the host vehicle V has exited the roundabout RN" is assessed in step S15 as the host vehicle having exited when the host vehicle V has exited the roundabout RA in, for example, FIG. 6. Whether or not the host vehicle V has exited the roundabout RA is assessed based on the host vehicle position information, etc.

In step S16, in continuation from the assessment that the host vehicle has exited in step S15 and step S25, control that determines to extinguish the left turn signal is performed, and the process advances to END. The left turn signal is thereby extinguished, resulting in a turn-signal-extinguished state.

In step S20, in continuation from the assessment that the positional relationship is not an adjacent relationship in step S12, whether or not the host vehicle has entered the circular roadway CR is assessed. When the assessment is YES (entered the circular roadway), the process advances to step S21, and when the assessment is NO (not entered the circular roadway), step S20 is repeated.

In this example, "whether or not the host vehicle V has entered the circular roadway CR" is assessed as the host vehicle V having entered the circular roadway CR when the host vehicle V passes through the host vehicle entrance EN and enters the circular roadway CR. Whether or not the host vehicle V has entered the circular roadway CR is assessed based on the host vehicle position information, etc.

In step S21, in continuation from the assessment that the host vehicle V has entered the circular roadway CR in step S20, control that determines to extinguish the left turn signal is performed and the process advances to step S22. The left turn signal is thereby extinguished, resulting in a turn-signal-extinguished state.

In step S22, in continuation from the determination to extinguish the left turn signal in step S21, whether or not the host vehicle V has arrived at the left-turn second illumination area A2 is assessed while the host vehicle V is traveling on the roundabout RA (see FIG. 7). When the assessment is YES (arrived at the second illumination area A2), the process advances to step S24, and when the assessment is NO (not arrived at the second illumination area A2), step S22 is repeated. Step S22 corresponds to the second illumination area arrival assessment part 35.

In this example, "whether or not the host vehicle V has arrived at the left-turn second illumination area A2" is assessed according to a drive distance ratio. Specifically, "whether or not the host vehicle V has arrived at the left-turn second illumination area A2" is assessed according to a ratio between a drive distance from the first illumination position 101 to the host vehicle exit EX and a drive distance (a variable) from the first illumination position 101 to the host vehicle position (see FIG. 7). For example, when the drive distance ratio is 0.8 to 1.0 (inclusive), the host vehicle V is assessed to have arrived at the left-turn second illumination area A2.

In step S24, in continuation from the assessment that the host vehicle has arrived at the second illumination area A2 in step S22 or at the second illumination area A5 in step S42, or the determination to extinguish the right turn signal in step S33, control that determines to illuminate the left turn signal is performed, and the process advances to step S25. The left turn signal is thereby illuminated from a turn-signal-extinguished state.

In step S25, in continuation from the determination to illuminate the left turn signal in step S24, an assessment is made as to whether or not the host vehicle V has exited the roundabout RA. When the assessment is YES (host vehicle has exited), the process advances to step S16, and when the assessment is NO (host vehicle has not exited), step S25 is repeated. Step S25, as does step S15, corresponds to the roundabout exit assessment part 37.

In this example, "whether or not the host vehicle V has exited the roundabout RA" is assessed in step S25 as the host vehicle having exited when the host vehicle V has exited the roundabout RA in, for example, FIGS. 7 to 10. Whether or not the host vehicle V has exited the roundabout RA is assessed based on the host vehicle position information, etc.

In step S31, in continuation from the assessment that the right turn signal illumination condition is fulfilled in step S7, control that determines to illuminate the right turn signal is performed and the process advances to step S32. The right turn signal is thereby illuminated from a turn-signal-extinguished state.

In step S32, in continuation from the determination to illuminate the right turn signal in step S31, an assessment is made as to whether or not the host vehicle V has arrived at the first-right-turn second illumination area A3 or the second-right-turn second illumination area A4 while the host vehicle V is traveling on the roundabout RA (see FIG. 8 or 9). When the assessment is YES (arrived at the second illumination area A3/A4), the process advances to step S33, and when the assessment is NO (not arrived at the second illumination area A3/A4), step S32 is repeated. step S32 corresponds to the second illumination area arrival assessment part 35.

In this example, "whether or not the host vehicle V has arrived at the first-right-turn second illumination area A3 or the second-right-turn second illumination area A4" is assessed according to a drive distance ratio. The method of assessment according to a drive distance ratio is similar to S22 and is therefore not described (see FIG. 8 or 9).

In step S33, in continuation from the assessment that the host vehicle has arrived at the second illumination area A3/A4 in step S32, control that determines to extinguish the right turn signal is performed and the process advances to step S24. The right turn signal is thereby extinguished, resulting in a turn-signal-extinguished state.

In step S41, in continuation from the assessment that the right turn signal illumination condition is not fulfilled in step S7, control is performed that determines to illuminate neither of the turn signals 6 indicating the left and right directions, and the process advances to step S42. Neither of the turn signals 6 indicating the left and right directions are thereby illuminated.

In step S42, in continuation from the determination to not illuminate the turn signals 6 in step S41, an assessment is made as to whether or not the host vehicle V has arrived at the straight-advance second illumination area A5 while the host vehicle V is traveling on the roundabout RA (see FIG. 10). When the assessment is YES (arrived at the second illumination area A5), the process advances to step S24, and when the assessment is NO (not arrived at the second illumination area A5), step S42 is repeated, Step S42 corresponds to the second illumination area arrival assessment part 35.

In this example, "whether or not the host vehicle V has arrived at the straight-advance second illumination area A5" is assessed according to a drive distance ratio. The method of assessment according to a drive distance ratio is similar to S22 and is therefore not described (see FIG. 10).

The action of the first embodiment shall be described next as a "driving assist control action" based on FIGS. 3 to 11.

The description of the driving assist control action is divided below into a "driving assist control action for the first target route TR1," a "driving assist control action for the second target route TR2," a "driving assist control action for the third target route TR3," a "driving assist control action for the fourth target route TR4," and a "driving assist control action for the fifth target route TR5."

The driving assist control action for the first target route TR1 is described first.

The control process of FIG. 4 is started, a target route, etc., is generated in S1, host vehicle surroundings information is acquired in S2, and the process advances from S2 to S3. When the roundabout arrival assessment of S3 is affirmative, the process advances from S3 to S4. The first illumination area A1 is set in S4 and the process advances from S4 to S5. In the first target route TR1, a second illumination area is not set in S4. In S5, the first illumination area arrival assessment is negative after some time. When the first illumination area arrive assessment of S5 is affirmative, the process advances from S5 to S6. In S6, the condition fulfillment assessment for the left turn signal illumination is affirmative, and the process advances from S6 to S11. The left turn signal is illuminated in S11 and the process advances from S11 to S12. An adjacent relationship assessment is affirmative in S12, and the process advances from S12 to S15. In S15, the host vehicle exit assessment is negative after some time. When the host vehicle exit assessment in S15 is negative, the process advances from S15 to S16. In S16, the left turn signal is extinguished, and the process advances from S16 to END.

The operation of the host vehicle V traveling on the first target route TR1 is next described based on FIG. 6.

Up to time t11, the host vehicle V has not arrived at the roundabout RA. The period up to time t11 corresponds to the flow repeated in the sequence of S1, S2, and "NO" in S3 of FIG. 4.

At time t11, the host vehicle V arrives at the roundabout RA and the first illumination area A1 is set, and from time t11 to time t12, the host vehicle V has not arrived at the first illumination area A1. A second illumination area is not set in the first target route TR1. Time t11 corresponds a flow including the "YES" option in S3 and leading to S4 and S5 in FIG. 4, and the period from time t11 to time t12 corresponds to the flow in which the "NO" option in S5 in FIG. 4 is repeatedly taken.

At time t12, the host vehicle V arrives at the first illumination area A1 and the left turn signal illumination condition is fulfilled. Therefore, the state of the turn signals is switched from a turn-signal-extinguished state to left turn signal illumination. In the first target route TR1, the positional relationship of the exit and entrance is an adjacent relationship. Thus, in accordance with the assessment of the positional relationship of the exit and entrance, control is performed that determines which of the turn signals 6 indicating the left and right directions will be illuminated when a turn signal 6 is to be illuminated. Time t12 corresponds to a flow including the "YES" option in S5 of FIG. 4, the "YES" option in S6 and the "YES" options in S11 and S12 of FIG. 5, and leading to S15.

At time t13, the host vehicle V has arrived at the host vehicle entrance EN and is about to enter the circular roadway CR. From time t13 to time t16, the host vehicle V is traveling on the circular roadway CR. The period from time t12 to time t16 corresponds to the flow in which the "NO" option in S15 of FIG. 5 is repeatedly taken.

At time t16, the host vehicle V has passed through the host vehicle exit EX, exited the roundabout RA, and completely entered the second connecting roadway R2. Therefore, the state of the turn signals is switched from left turn signal illumination to a turn-signal-extinguished state. Time t16 corresponds to a flow including the "YES" option in S15 of FIG. 5 and leading to S16 and END.

When the host vehicle V enters the roundabout RA, an action plan of the host vehicle can thereby be communicated by left turn signal illumination to other vehicles V1, V2 in the surroundings of the host vehicle. Furthermore, from the time the host vehicle enters through the host vehicle entrance EN until the host vehicle V exits the roundabout RA, an action plan indicating that the host vehicle V will turn into the second connecting roadway R2 can be communicated to the other vehicle V2 in particular in the surroundings of the host vehicle by continuing to illuminate the left turn signal. In other words, due to the left turn signal illumination being continued, the other vehicle V2 can be prepared for the travel of the host vehicle V from the roundabout RA to the second connecting roadway R2 (the exit of the host vehicle V from the roundabout RA).

The other vehicle V1 represents a following vehicle while the host vehicle V is traveling on the first entry roadway R11. The other vehicle V2 represents a vehicle traveling on the circular roadway CR when the host vehicle V enters the circular roadway CR, and also represents a following vehicle while the host vehicle V is traveling on the circular roadway CR.

The driving assist control action for the second target route TR2 is described next. The flow from the start of the control process of FIG. 4 until S12 of FIG. 5 and the flow advancing from S16 to END are the same as those of the driving assist control action for the first target route TR1 and are therefore not described. For the second target route TR2, the left-turn second illumination area A2 is set in step S4, which is different from S4 for the first target route TR1.

The adjacent relationship assessment is negative in S12, and the process advances from S12 to S20. In S20, an assessment of entering a circular roadway is negative after some time. When the assessment of entering a circular roadway in S20 is affirmative, the process advances from S20 to S21. The left turn signal is extinguished in S21, and the process advances from S21 to S22. In S22, the assessment of arrival at the left-turn second illumination area is negative. When the assessment of arrival at the left-turn second illumination area of S22 is affirmative, the process advances from S22 to S24. The left turn signal is illuminated in S24, and the process advances from S24 to S25. In S25, the host vehicle exit assessment is negative after some time. When the host vehicle exit assessment in S25 is affirmative, the process advances from S25 to S16.

Next, the operation of the host vehicle V traveling on the second target route TR2 is described based on FIG. 7. The period up to time t22 of FIG. 7 is the same as the period up to time t12 of FIG. 6 and is therefore not described. For the second target route TR2, the left-turn second illumination area A2 is set at time t21, which is different from time t11 for the first target route TR1.

At time t22, the host vehicle V arrives at the first illumination area A1 and the left turn signal illumination condition is fulfilled. Therefore, the state of the turn signals is switched from a turn-signal-extinguished state to left turn signal illumination. The positional relationship of the exit and entrance is not an adjacent relationship in the second target route TR2. Time t22 corresponds to a flow including the "YES" option in S5 of FIG. 4, the "YES" option in S6 of FIG. 5, and the "NO" options in S11 and S12, and leading to S20.

Time t23 is a time at which the host vehicle V has arrived at the host vehicle entrance EN and is about to enter the circular roadway CR. The period from time t22 to time t24 corresponds to a flow in which the "NO" option in S20 of FIG. 5 is repeatedly taken. From time t23 to time t26, the host vehicle V travels on the circular roadway CR.

At time t24, the host vehicle V enters the circular roadway CR. Therefore, the state of the turn signals is switched from left turn signal illumination to a turn-signal-extinguished state. From time 24 to time t25, the left turn signal remains extinguished, and the host vehicle V has not arrived at the left-turn second illumination area A2. Time t24 corresponds to a flow including the "YES" option in S20 of FIG. 5 and leading to S21 and S22. The period from time t24 to time t25 corresponds to a flow in which the "NO" option in S22 of FIG. 5 is repeatedly taken.

At time t25, the host vehicle V arrives at the left-turn second illumination area A2. Therefore, the state of the turn signals is switched from a turn-signal-extinguished state to left turn signal illumination. Time t25 corresponds to a flow including the "YES" option in S22 of FIG. 5 and leading to S24 and S25. The period from time t25 to time t26 corresponds to a flow in which the "NO" option in S25 of FIG. 5 is repeatedly taken.

At time t26, the host vehicle V has passed through the host vehicle exit EX to exit the roundabout RA, and entry into the third connecting roadway R3 is complete. Therefore, the state of the turn signals is switched from left turn signal illumination to a turn-signal-extinguished state. Time t26 corresponds to a flow including the "YES" option in S25 of FIG. 5 and leading to S16 and END.

An action plan of the host vehicle can thereby be communicated to other vehicles V1, V2 in the surroundings of the host vehicle by left turn signal illumination when the host vehicle V enters the roundabout RA. Furthermore, after the host vehicle V has entered the circular roadway CR, the left turn signal remains extinguished until the host vehicle arrives at the left-turn second illumination area A2 (while the host vehicle V is traveling on the circular roadway CR). The action plan in which the host vehicle V does not turn into the second connecting roadway R2 can thereby be communicated to the other vehicle V2 in particular in the surroundings of the host vehicle. Furthermore, when the host vehicle V is to exit the roundabout RA, the action plan in which the host vehicle V turns into the third connecting roadway R3 can be communicated by left turn signal illumination to the other vehicle V2 in particular in the surroundings of the host vehicle when the host vehicle V arrives at the left-turn second illumination area A2. In other words, the re-illumination of the left turn signal enables the other vehicle V2 to prepare for the traveling of the host vehicle V from the roundabout RA into the third connecting roadway R3 (the exiting of the host vehicle V from the roundabout RA). These other vehicles V1, V2 are similar to the other vehicles V1, V2 in the driving assist control action for the first target route TR1 and are therefore not described.

Next, the driving assist control action for the third target route TR3 shall be described. The flow beginning at the start of the control process of FIG. 4 and leading to S6 in FIG. 5 and the flow advancing from S24 to END are similar to those of the driving assist control action for the second target route TR2 and are therefore not described. For the third target route TR3 a first-right-turn second illumination area A3 is set in step S4, which is different from S4 for the second target route TR2.

In S6, the condition fulfillment assessment for left turn signal illumination is negative, and the process advances from S6 to S7. In S7, the condition fulfillment assessment for right turn signal illumination is affirmative and the process advances from S7 to S31. In S31, the right turn signal is illuminated and the process advances from S31 to S32. In S32, an assessment of arrival at a first-right-turn second illumination area is negative after some time. When the assessment of arrival at a first-right-turn second illumination area of S32 is affirmative, the process advances from S32 to S33. In S33, the right turn signal is extinguished and the process advances from S33 to S24.

The operation of the host vehicle V traveling on the third target route TR3 shall next be described based on FIG. 8. The period up to time 32 in FIG. 8 is similar to the period up to time t22 in FIG. 7 and is therefore not described. For the third target route TR3, a first-right-turn second illumination area A3 is set at time t31, which is different from time t21 for the second target route TR2.

At time t32, the host vehicle V arrives at the first illumination area A1, the left turn signal illumination condition is not fulfilled, and the right turn signal illumination condition is fulfilled. Therefore, the state of the turn signals is switched from a turn-signal-extinguished state to right turn signal illumination. Time t32 corresponds to a flow including the "YES" option in S5 of FIG. 4 and the "NO" option in S6 and the "YES" option in S7 of FIG. 5, and leading to S31 and S32.

Time t33 is a time when the host vehicle V has arrived at the host vehicle entrance EN and is about to enter the circular roadway CR. From time t32 to time t35, the right turn signal remains illuminated and the host vehicle V has not arrived at the first-right-turn second illumination area A3. From time t33 to time t36, the host vehicle V travels on the circular roadway CR. The period from time t32 to time t35 corresponds to a flow in which the "NO" option in S32 of FIG. 5 is repeatedly taken.

At time t35, the host vehicle V arrives at the first-right-turn second illumination area A3. Therefore, the state of the turn signals is switched from right turn signal illumination to a turn-signal-extinguished state, and from a turn-signal-extinguished state to left turn signal illumination. Specifically, illumination is switched from the right turn signal to the left turn signal. Time t35 corresponds to a flow including "YES" in S32 of FIG. 5 and leading to S33, S24, and S25. The period from time t35 to time t36 corresponds to a flow in which the "NO" option in S25 of FIG. 5 is repeatedly taken.

At time t36, the host vehicle V has passed through the host vehicle exit EX to exit the roundabout RA, and entry into the fifth connecting roadway R5 is complete. Therefore, the state of the turn signals is switched from left turn signal illumination to a turn-signal-extinguished state. Time t36 corresponds to a flow including the "YES" option in S25 of FIG. 5 and leading to S16 and END.

The action plan of the host vehicle can thereby be communicated by right turn signal illumination to the other vehicles V1, V2 in the surroundings of the host vehicle when the host vehicle V enters the roundabout RA. Furthermore, while the host vehicle V is traveling in the roundabout RA (the circular roadway CR) and until the host vehicle V arrives at the first-right-turn second illumination area A3, the right turn signal remains illuminated. The action plan in which the host vehicle V does not turn into the second through fourth connecting roadways R2 to R4 can thereby be communicated to the other vehicle V2 in particular in the surroundings of the host vehicle. Furthermore, when the host vehicle V is to exit the roundabout RA, illumination is switched from the right turn signal to the left turn signal when the host vehicle V arrives at the first-right-turn second illumination area A3. The action plan in which the host vehicle V turns into the fifth connecting roadway R5 can thereby be communicated to the other vehicle V2 in particular in the surroundings of the host vehicle. In other words, the switching of the illumination from the right turn signal to the left turn signal enables the other vehicle V2 to prepare for the traveling of the host vehicle V from the roundabout RA to the fifth connecting roadway R5 (the exiting of the host vehicle V from the roundabout RA). The other vehicles V1, V2 are similar to the other vehicles V1, V2 in the driving assist control action for the first target route TR1 and are therefore not described.

The driving assist control action for the fourth target route TR4 shall be described next. A flow beginning at the start of the control process of FIG. 4 and advancing to END in FIG. 5 is similar to the driving assist control action for the third target route TR3 and is therefore not described. For the fourth target route TR4, a second-right-turn second illumination area A4 is set in step S4 and whether or not the host vehicle has arrived at the second-right-turn second illumination area A4 is assessed in step S32, which are different from S4 and S32 for the third target route TR3.

The operation of the host vehicle V traveling on the fourth target route TR4 shall be described next based on FIG. 9. The period up to time t33 in FIG. 9 is similar to the period up to time t33 in FIG. 8 and is therefore not described. For the fourth target route TR4, a second-right-turn second illumination area A4 is set at time t31, which is different from time t31 for the third target route TR3.

From time t32 to time t34, the right turn signal remains illuminated and the host vehicle V has not arrived at the second-right-turn second illumination area A4. From time t33 to time t36, the host vehicle V travels on the circular roadway CR. The period from time t32 to time t34 corresponds to a flow in which the "NO" option in S32 of FIG. 5 is repeatedly taken.

With the fourth target route TR4 in this example, unlike the third target route TR3, the other vehicle V3 enters the roundabout RA from the fourth entry roadway R41. Therefore, the second-right-turn second illumination area A4 is set from a position nearer to the third connecting roadway R3 than the first-right-turn second illumination area A3 to a position close to the fifth connecting roadway R5 of the host vehicle exit EX. In the fourth target route TR4, the host vehicle V thereby arrives at the second-right-turn second illumination area A4 at time t34, which occurs earlier than time t35 of the third target route TR3. Therefore, the state of the turn signals is switched from right turn signal illumination to a turn-signal-extinguished state, and from a turn-signal-extinguished state to left turn signal illumination. Specifically, illumination is switched from the right turn signal to the left turn signal. Time t34 corresponds to a flow including the "YES" in S32 of FIG. 5 and leading to S33, S24, and S25. The period from time t34 to time t36 corresponds to a flow in which the "NO" option in S25 of FIG. 5 is repeatedly taken. Time t36 is similar to time t36 of the third target route TR3 and is therefore not described.

The action plan of the host vehicle can thereby be communicated by right turn signal illumination to the other vehicles V1, V2 in the surroundings of the host vehicle when the host vehicle V enters the roundabout RA. Furthermore, while the host vehicle V is traveling on the roundabout RA (the circular roadway CR) and until the host vehicle V arrives at the second-right-turn second illumination area A4, the right turn signal remains illuminated. The action plan in which the host vehicle V does not turn into the second connecting roadway R2, the third connecting roadway R3, or the fourth exit roadway R42 can thereby be communicated to the other vehicles V2, V3 in particular in the surroundings of the host vehicle. In other words, due to the right turn signal remaining illuminated, the other vehicle V3 will give priority to the host vehicle V without entering the circular roadway CR. Furthermore, when the host vehicle V is to exit the roundabout RA, illumination switches from the right turn signal to the left turn signal when the host vehicle V arrives at the second-right-turn second illumination area A4. The action plan in which the host vehicle V turns into the fifth connecting roadway R5 can thereby be communicated to the other vehicle V2 in particular in the surroundings of the host vehicle. In other words, the switching of illumination from the right turn signal to the left turn signal enables the other vehicle V2 to prepare for the traveling of the host vehicle V from the roundabout RA to the fifth connecting roadway R5 (the exiting of the host vehicle V from the roundabout RA).

The other vehicles V1, V2 are similar to the other vehicles V1, V2 in the driving assist control action for the first target route TR1 and are therefore not described. The other vehicle V3 is a vehicle that is about to enter the circular roadway CR from the fourth entry roadway R41 while the host vehicle V is traveling on the circular roadway CR.

Lastly, the driving assist control action for the fifth target route TR5 shall be described. A flow beginning at the start of the control process of FIG. 4 and leading to S7 of FIG. 5 and a flow advancing from S24 to END are similar to those of the driving assist control action for the third target route TR3 and are therefore not described. For the fifth target route TR5, a straight-advance second illumination area A5 is set in step S4, which is different from S4 for the third target route TR3.

In S7, the condition fulfillment assessment for right turn signal illumination is negative and the process advances from S7 to S41. In S41, neither of the turn signals 6 indicating the left and right directions is illuminated and the process advances from S41 to S42. In S42, an assessment of arrival at a straight-advance second illumination area is negative after some time. When the assessment of arrival at a straight-advance second illumination area of S42 is affirmative, the process advances from S42 to S24.

The operation of the host vehicle V traveling on the fifth target route TR5 shall next be described based on FIG. 10. The period up to time t42 in FIG. 10 is similar to the period up to time t22 in FIG. 7 and is therefore not described. For the fifth target route TR5, the straight-advance second illumination area A5 is set at time t41, which is different from time t21 for the second target route TR2. Furthermore, the fifth target route TR5 differs from the second target route TR2 in that whether or not to illuminate the turn signals 6 is determined in accordance with the assessment of the positional relationship of the exit and entrance.

At time t42, the host vehicle V arrives at the first illumination area A1 and the left turn signal illumination condition and right turn signal illumination condition are not fulfilled. Therefore, neither of the turn signals 6 indicating the left and right directions is illuminated (a turn-signal-extinguished state). Time t42 corresponds to a flow including the "YES" option in S5 of FIG. 4 and the "NO" options in S6 and in S7 of FIG. 5, and leading to S41 and S42.

Time t43 is a time at which the host vehicle V arrives at the host vehicle entrance EN and is about to enter the circular roadway CR. From time t42 to time t45, the turn-signal-extinguished state is continued, and the host vehicle V has not arrived at the straight-advance second illumination area A5. From time t43 to time t46, the host vehicle V travels on the circular roadway CR. The period from time t42 to time t45 corresponds to a flow in which the "NO" option in S42 of FIG. 5 is repeatedly taken.

At time t45, the host vehicle V arrives at the straight-advance second illumination area A5. Therefore, the state of the turn signals is switched from a turn-signal-extinguished state to left turn signal illumination. Time t45 corresponds to a flow including the "YES" option in S42 of FIG. 5 and leading to S24 and S25. The period from time t45 to time t46 corresponds to a flow in which the "NO" option in S25 of FIG. 5 is repeatedly taken.

At time t46, the host vehicle V has passed through the host vehicle exit EX to exit the roundabout RA, and completed entry into the fourth connecting roadway R4. Therefore, the state of the turn signals is switched from left turn signal illumination to a turn-signal-extinguished state. Time t46 corresponds to a flow including the "YES" option in S25 of FIG. 5 and leading to S16 and END.

Due to the process described above, when the host vehicle V enters the roundabout RA, the action plan of the host vehicle can be communicated to the other vehicles V1, V2 in the surroundings of the host vehicle by an extinguished state in which neither of the turn signals 6 indicating the left and right directions is illuminated. Furthermore, while the host vehicle V is traveling on the circular roadway CR and until the host vehicle V arrives at the straight-advance second illumination area A5, the extinguished state is continued in which neither of the turn signals 6 indicating the left and right directions is illuminated. The action plan in which the host vehicle V does not turn into the second connecting roadway R2 or the third connecting roadway R3 can thereby be communicated to the other vehicle V2 in particular in the surroundings of the host vehicle. Furthermore, when the host vehicle V is to exit the roundabout RA, the action plan in which the host vehicle V turns into the fourth connecting roadway R4 can be communicated by left turn signal illumination to the other vehicle V2 in particular in the surroundings of the host vehicle when the host vehicle V arrives at the straight-advance second illumination area A5. In other words, left turn signal illumination enables the other vehicle V2 to prepare for the traveling of the host vehicle V from the roundabout RA to the fourth connecting roadway R4 (the exiting of the host vehicle V from the roundabout RA). The other vehicles V1, V2 are similar to the other vehicles V1, V2 in the driving assist control action for the first target route TR1 and are therefore not described.

Thus, in the driving assist control actions for the first through fifth target routes TR1 to TR5, when the host vehicle V is to enter the roundabout RA, the action plan of the host vehicle can be communicated to other vehicles in the surroundings of the host vehicle depending on which of the turn signals 6 is illuminated and which is not illuminated. Furthermore, when the host vehicle V is to exit the roundabout RA, the action plan in which the host vehicle V turns into any of the connecting roadways R2 to R5 can be communicated to other vehicles in the surroundings of the host vehicle by left turn signal illumination.

For the first through fifth target routes TR1 to TR5, cases are described in which the connecting roadways connected to the host vehicle exits EX split into entry roadways and exit roadways, and there are other vehicles about to enter the circular roadway CR from the entry roadways. In such cases, when the host vehicle V is to exit the roundabout RA, the action plan in which the host vehicle V turns into an exit roadway of a connecting roadway can be communicated to other vehicles in the surroundings of the host vehicle by illuminating the left turn signal. In other words, left turn signal illumination enables the other vehicles to start entering the circular roadway CR.

Furthermore, for the second target route TR2, a case is described in which the second connecting roadway R2 connected to the first exit splits into an entry roadway and an exit roadway, and there is the other vehicle about to enter the circular roadway CR from the entry roadway of the second connecting roadway R2. In such cases, the left turn signal is extinguished after the host vehicle V has entered the roundabout RA (the circular roadway CR), whereby the action plan in which the host vehicle V turns into the exit roadway of the second connecting roadway R2 can be communicated to the other vehicle in the surroundings of the host vehicle. In other words, due to the extinguishing of the left turn signal, the other vehicle does not enter the circular roadway CR and gives priority to the host vehicle V.

As described above, the effects enumerated below are achieved with the driving assist method and the driving assist device of the first embodiment.

(1) A controller (recognition assessment processor 3) is provided, the controller computing a travel route (target route) on which the host vehicle V will travel and executing driving assist control based on the travel route (target route) (FIGS. 1 and 2). In this driving assist method, whether or not the host vehicle V has arrived at the roundabout RA is assessed (S3 in FIG. 4). When the host vehicle V is assessed to have arrived at the roundabout RA, the positional relationship between the host vehicle entrance EN for the host vehicle V and the host vehicle exit EX for the host vehicle V in the roundabout RA is assessed based on the travel route (target route) (S6 and S7 in FIG. 5). When the host vehicle V enters the roundabout RA (circular roadway CR), control of the direction indicator lights (the turn signals 6) is performed in accordance with the positional relationship that was assessed (S11, S21, S31, and S41 in FIG. 5).

Thus, the direction indicated by the turn signals 6 is controlled by performing a control of the turn signals 6 in accordance with the target route on which the host vehicle V is intended to travel. As a result, it is possible to provide a driving assist method in which, when the host vehicle V enters the roundabout RA (the circular roadway CR), an action plan of the host vehicle V is communicated by direction indication to other vehicles in the surroundings of the host vehicle.

(2) In accordance with the positional relationship that was assessed, a control is performed to determine which of the direction indicator lights (turn signals 6) indicating the left and right directions to illuminate (S11 and S31 in FIG. 5).

Thus, by performing a control to determine which of the turn signals 6 indicating the left and right directions to illuminate, the direction indicated by the turn signals 6 is controlled based on this determination. As a result, when the host vehicle V enters the roundabout RA (the circular roadway CR), an action plan of the host vehicle V can be communicated to other vehicles in the surroundings of the host vehicle by indicating either the left or right direction.

(3) In accordance with the positional relationship that was assessed, a control is performed to determine whether or not to illuminate the direction indicator lights (the turn signals 6) (S11, S21, S31, and S41 in FIG. 5).

Thus, by performing a control to determine whether or not to illuminate the turn signals 6, the direction indicated by the turn signals 6 is controlled based on this determination. As a result, when the host vehicle V enters the roundabout RA (the circular roadway CR), an action plan of the host vehicle V can be communicated to other vehicles in the surroundings of the host vehicle by direction indication.

(4) The assessment of whether or not the host vehicle has arrived at the roundabout RA is an assessment that the host vehicle has arrived at the roundabout RA when the host vehicle has come within a prescribed distance D of the roundabout RA (S3 in FIG. 4).

Thus, by performing a control to determine the turn signals 6 in accordance with the target route on which the host vehicle V is intended to travel before the host vehicle actually enters the roundabout RA (the circular roadway CR), the direction indicated by the turn signals 6 is controlled based on this determination. As a result, the travel plan of the host vehicle V can be communicated by direction indication to the other vehicles in the surroundings of the host vehicle at a timing before the host vehicle actually enters the roundabout RA (the circular roadway CR).

(5) The positional relationship is assessed from the relative angle θ between the host vehicle entrance EN and the host vehicle exit EX (S6 and S7 in FIG. 5).

Thus, due to the positional relationship being assessed from the relative angle θ, control that accurately determines the direction indicated by the turn signals 6 can be performed, and the direction indicated by the turn signals 6 is controlled based on this determination. As a result, when the host vehicle V enters the roundabout RA (the circular roadway CR), an action plan of the host vehicle V can be accurately communicated by direction indication to other vehicles in the surroundings of the host vehicle.

(6) From the time the host vehicle V enters through the host vehicle entrance EN until the host vehicle V exits the roundabout RA, the current positional relationship between the current position of the host vehicle V and the host vehicle exit EX is successively compared, and an assessment is made as to whether or not a switching condition for switching the direction indicated by the direction indicator lights (the turn signals 6) is fulfilled. When the switching condition has been fulfilled, the direction indicated by the direction indicator lights (the turn signals 6) is switched based on the switching condition (the flow from S11 to S21 in FIG. 5, the flow from S21 to S24 in FIG. 5, the flow from S31 to S33 in FIG. 5, the flow from S33 to S24 in FIG. 5, and the flow from S41 to S24 in FIG. 5).

Thus, from the time the host vehicle V enters through the host vehicle entrance EN until the host vehicle V exits the roundabout RA, an action plan of the host vehicle V while in the roundabout RA can be communicated to other vehicles in the surroundings of the host vehicle by switching the direction indicated by the turn signals 6. As a result, an action plan of the host vehicle V while in the roundabout RA can be communicated to other vehicles in the surroundings of the host vehicle from the time the host vehicle V enters through the host vehicle entrance EN until the host vehicle V exits the roundabout RA.

The following switches are all considered to be switching conditions. One is a switch from left turn signal illumination to a turn-signal-extinguished state in the flow from S11 to S21 in FIG. 5. Another is a switch from a turn-signal-extinguished state to left turn signal illumination in the flow from S21 to S24 in FIG. 5, the flow from S33 to S24 in FIG. 5, and the flow from S41 to S24 in FIG. 5. Another is a switch from right turn signal illumination to a turn-signal-extinguished state in the flow from S31 to S33 in FIG. 5.

(7) When the following two conditions are met, the direction indicator lights (the turn signals 6) are extinguished after the host vehicle V has entered the roundabout RA (the circular roadway CR) (the flow from S20 to S21 in FIG. 5). First, one is that the direction indicated by the direction indicator lights (the turn signals 6) when the host vehicle V enters the roundabout RA (the circular roadway CR) is opposite (left turn signal) of the direction of rotation (right) when the host vehicle is passing through the roundabout RA (S11 in FIG. 5). The other is that the host vehicle exit EX is an exit (third connecting roadway) following the first exit (second connecting roadway R2) after the host vehicle has come into the roundabout RA (the flow from S12 to S20 in FIG. 5).

Thus, by extinguishing the left turn signal after the host vehicle V has entered the roundabout RA (the circular roadway CR), it is possible to communicate that the host vehicle exit EX is not the first exit to following vehicles in the surroundings of the host vehicle and to other vehicles about to enter the circular roadway CR from a connecting roadway (entry roadway) connected to the first exit. As a result, while the host vehicle V is traveling on the roundabout RA (the circular roadway CR), the action plan of the host vehicle V while on the roundabout RA can be communicated to other vehicles in the surroundings of the host vehicle at the timing at which the host vehicle V enters the roundabout RA (the circular roadway CR).

(8) When the host vehicle V is to exit the roundabout RA, the direction indicated by the last illuminated direction indicator light (turn signal 6) is opposite (left turn signal) of the direction of rotation (right) when the host vehicle is passing through the roundabout RA (the flow from S11 to S15 in FIG. 5, the flow of S21-S24 in FIG. 5, the flow from S31 to S24 in FIG. 5, and the flow from S41 to S24 in FIG. 5).

Thus, by illuminating the left turn signal when the host vehicle V is to exit the roundabout RA, the exiting of the host vehicle V from the roundabout RA can be communicated to following vehicles in the surroundings of the host vehicle and to other vehicles about to enter the circular roadway CR from the connecting roadway (entry roadway) connected to the host vehicle exit EX. As a result, while the host vehicle V is traveling on the roundabout RA (the circular roadway CR), the action plan of the host vehicle V while on the roundabout RA can be communicated to other vehicles in the surroundings of the host vehicle at the timing at which the host vehicle V exits the roundabout RA.

(9) A controller (the recognition assessment processor 3) is provided, the controller computing a travel route (the target route) on which the host vehicle will travel and executing driving assist control based on the travel route (the target route) (FIGS. 1 and 2). In this driving assist device, the controller (the recognition assessment processor 3) has a roundabout arrival assessment part 32, a positional relationship assessment part 36, and a direction indicator light control part (the turn signal control part 38). The roundabout arrival assessment part 32 assesses whether or not the host vehicle V has arrived at the roundabout RA (S3 in FIG. 4). When the roundabout arrival assessment part 32 assesses that the host vehicle V has arrived at the roundabout RA, the positional relationship assessment part 36 assesses the positional relationship between the host vehicle entrance EN for the host vehicle V and the host vehicle exit EX for the host vehicle V in the roundabout RA based on the travel route (the target route) (S6 and S7 in FIG. 5). When the host vehicle V enters the roundabout RA (the circular roadway CR), the direction indicator light control part (the turn signal control part 38) performs control on the direction indicator lights (the turn signals 6) in accordance with the positional relationship that was assessed by the positional relationship assessment part 36 (S11, S21, S31, and S41 in FIG. 5). The direction indicator lights (the turn signals 6) indicate the left and right directions.

Thus, the direction indicated by the turn signals 6 is controlled by performing control on the turn signals 6 in accordance with the target route on which the host vehicle V is intended to travel. As a result, it is possible to provide a driving assist device in which an action plan of the host vehicle V is communicated by direction indication to other vehicles in the surroundings of the host vehicle when the host vehicle V enters the roundabout RA (the circular roadway CR).

The driving assist method and the driving assist device of the present disclosure were described above based on the first embodiment, but this example is not provided by way of limitation on the specific configuration; design changes, additions, etc., are allowed as long as there is no deviation from the scope of the invention as in the claims.

In the first embodiment, an example was presented in which the host vehicle V arrives at the roundabout RA ("YES" in S3 of FIG. 4), and when the host vehicle V is assessed to have arrived at the first illumination area A1 ("YES" in S5 of FIG. 4), the positional relationship between the host vehicle entrance EN and the host vehicle exit EX is assessed (S6 and S7 in FIG. 5). However, this example is not provided by way of limitation. For example, the setting of a first illumination area in S4 of FIG. 4 and the assessment in S5 of FIG. 4 may be omitted. Specifically, the positional relationship between the host vehicle entrance and the host vehicle exit may be assessed after the host vehicle has arrived at the roundabout. When the host vehicle is assessed to have arrived at the roundabout, direction indicator light control is preferably performed in accordance with the positional relationship that was assessed when the host vehicle enters the roundabout (circular roadway).

In the first embodiment, an example was presented in which the assessment made in the roundabout arrival assessment part 32 of whether or not the host vehicle V has arrived at the roundabout RA is an assessment that the host vehicle V has arrived at the roundabout RA when the host vehicle V has come to be within a prescribed distance D of the roundabout RA. However, this example is not provided by way of limitation. For example, in the roundabout arrival assessment part, the assessment of whether or not the host vehicle has arrived at the roundabout may involve assessing that the host vehicle has arrived at the roundabout when a road sign installed close to the roundabout is recognized. The term "road sign" refers to a sign indicating that there is a roundabout in the advancing direction of the host vehicle. The roundabout arrival assessment part receives input of host vehicle surrounding information. Additionally, the assessment that the host vehicle has arrived at the roundabout may be made when the host vehicle has actually arrived at the roundabout.

In the first embodiment, an example was presented in which the prescribed distance D of the roundabout arrival assessment part 32 is set such that the current host vehicle position is 50 m from the roundabout RA while the host vehicle V is traveling on the first connecting roadway R1. However, this example is not provided by way of limitation on the prescribed distance. An example of the prescribed distance is given below.

The prescribed distance may be changed based on the speed limit of the connecting roadway on which the host vehicle is traveling. Furthermore, the roundabout arrival assessment part has a prescribed distance table for each speed limit. A prescribed distance table may be read in accordance with the speed limit of the connecting roadway, and whether or not the host vehicle has arrived at the roundabout may be assessed. The prescribed distance table has, for example, prescribed distance values that are set longer with higher speed limits, and conversely, prescribed distance values that are set shorter with lower speed limits. Furthermore, instead of using a distance table, the prescribed distance may be changed to a distance obtained by multiplying the speed limit and a prescribed number of seconds. The prescribed number of seconds may be fixed at several seconds regardless of the speed limit, or the prescribed number of seconds may be changed in accordance with the speed limit.

When there is a branching roadway close to the roundabout, the prescribed distance may be changed depending on the presence or absence of the branching roadway.

The prescribed distance may be changed based on the amount of surrounding traffic from host vehicle surroundings information. For example, the prescribed distance is set shorter for greater amounts of traffic, and the prescribed distance is set longer for lesser amounts of traffic. The roundabout arrival assessment part 32 receives input of the host vehicle surroundings information.

The prescribed distance may be determined using a break line for an entry roadway into the roundabout as a reference. The term "break line" refers to a line indicating a position where a vehicle stops before entering a roundabout in order to give priority to vehicles traveling on the roundabout. For example, the break line is a yield line.

In the first embodiment, an example was presented in which the positional relationship is assessed from the relative angle θ shown in FIG. 11. However, this example is not provided by way of limitation. For example, the value of the first angle may be greater and the value of the second angle may be less than in the first embodiment. Conversely, the value of the first angle may be less and the angle of the second angle may be greater than in the first embodiment. Additionally, the relative angle may be established according to the number of roads connected to the circular roadway. In short, the positional relationship is preferably assessed from the relative angle between the host vehicle entrance and the host vehicle exit. In the first embodiment, an example was presented in which the conditions are met when the entire host vehicle exit (the border of the round dashed line L1 and the connecting roadway) is within the relative angle θ, but this example is not provided by way of limitation. For example, which condition is met may be assessed according to, inter alia, the percentage within the relative angle θ.

In the first embodiment, an example was presented in which the positional relationship of the host vehicle entrance EN and the host vehicle exit EX in the roundabout RA is assessed in the positional relationship assessment part 36 from the relative angle θ between the host vehicle entrance EN and the host vehicle exit EX. Furthermore, an example was presented in which the relative angle θ is calculated from the positions of the host vehicle entrance EN and the host vehicle exit EX as seen from the center CE of the roundabout RA. However, this example is not provided by way of limitation. For example, the relative angle may be calculated from the angle of the connecting roadway serving as the entry roadway of the host vehicle entrance and the angle of the connecting roadway serving as the exit roadway of the host vehicle exit.

In the first embodiment, an example was presented in which the positional relationship of the host vehicle entrance EN and the host vehicle exit EX in the roundabout RA is assessed in the positional relationship assessment part 36 from the relative angle θ between the host vehicle entrance EN and the host vehicle exit EX. However, this example is not provided by way of limitation. An example of positional relationship assessment is presented below.

The positional relationship may be assessed from a relative distance between the host vehicle entrance and the host vehicle exit. Specifically, a drive distance from the host vehicle entrance to the host vehicle exit is computed from a lane center line in the map data, and a ratio relative to the total length of the roundabout is computed. The positional relationship may be assessed from this ratio. For example, when the ratio is greater than 0 and no more than 0.4, the positional relationship of the exit and entrance is preferably a condition for illuminating the left turn signal as in the first embodiment. Furthermore, when the ratio is greater than 0.4 and no more than 0.6, the positional relationship of the exit and entrance is preferably a condition for not illuminating either of the turn signals 6 indicating the left and right directions as in the first embodiment. Furthermore, when the ratio is greater than 0.6 and no more than 1.0, the positional relationship of the exit and entrance is preferably a condition for illuminating the right turn signal as in the first embodiment.

The positional relationship may be assessed from the result of calculating what number exit the host vehicle exit is, counting from the host vehicle entrance. For example, the number of connecting roadways could be six. In this case, the host vehicle entrance is counted as zero. When the host vehicle exit is in the middle of the first through fifth connecting roadways, i.e., the third, the positional relationship of the exit and entrance meets the condition for not illuminating either of the turn signals 6 indicating the left and right directions. When the host vehicle exit is the first or second, the positional relationship of the exit and entrance preferably meets the condition for illuminating the left turn signal as in the first embodiment. Furthermore, when the host vehicle exit is the fourth or fifth, the positional relationship of the exit and entrance preferably meets the condition for illuminating the right turn signal as in the first embodiment. Additionally, the number of connecting roadways could be six and the host vehicle entrance and the second connecting roadway could have the same road name. In this case, when the host vehicle exit is second, the positional relationship of the first and third through fifth connecting roadways is preferably assessed, assuming that the positional relationship of the exit and entrance meets the condition for not illuminating either of the turn signals 6 indicating the left and right directions.

The positional relationship may be assessed based on the direction (left/straight ahead/right) in which the host vehicle exit is present in relation to the host vehicle entrance.

The positional relationship may be assessed based on information for turning left, advancing straight, and turning right within the map data information.

The positional relationship may be assessed by combining a plurality of these positional relationship assessments.

In the first embodiment, an example was presented in which the left turn signal is extinguished after the host vehicle V has entered the circular roadway CR when the following two conditions are met (the flow from S20 to S21 in FIG. 5). First, one is that the left turn signal is illuminated when the host vehicle V enters the roundabout RA (the circular roadway CR) (S11 in FIG. 5). The other is when the host vehicle exit EX is an exit following the first exit after the host vehicle has come into the roundabout RA (the flow from S12 to S20 in FIG. 5). However, this example is not provided by way of limitation. In short, the left of the direction indicator lights (the left turn signal) is preferably extinguished after the host vehicle has entered the circular roadway.

In the first embodiment and the example described above, an example was presented in which the roundabout RA includes the center island C, the circular roadway CR, the connecting portions (the host vehicle entrance EN and the host vehicle exit EX) between the circular roadway CR and the connecting roads R1-R6, and portions of the connecting roads R1-R6. However, this example is not provided by way of limitation. For example, the roundabout may include the center island, the circular roadway CR, and the connecting portions (the host vehicle entrance EN and the host vehicle exit EX) between the circular roadway CR of the first embodiment, or the roundabout may include the center island C and the circular roadway CR of the first embodiment. Even with such a configuration, the effects described in (1) to (7) of the first embodiment are achieved.

In the first embodiment and the example described above, an example was presented in which the driving assist method and the driving assist device of the present disclosure are applied to the roundabout RA in which the six connecting roads R1-R6 are connected to the circular roadway CR. However, this example is not provided by way of limitation. For example, the method and device may be applied to a roundabout in which four or eight roads are connected to a circular roadway. In short, the method and device can be applied if the roundabout has three or more roads connected to a circular roadway.

In the first embodiment and the example described above, an example was presented in which the driving assist method and the driving assist device of the present disclosure are applied to case of left-side traffic. However, this example is not provided by way of limitation; the driving assist method and the driving assist device of the present disclosure may be applied to a case of right-side traffic. In this case, the direction of rotation when passing through the circular roadway, the illumination direction indicated by the direction indicator lights, etc., are the opposite in terms of left and right from those of the first embodiment and the example described above.

In the first embodiment, an example was presented in which the driving assist method and the driving assist device of the present disclosure are applied to an autonomously driven vehicle in which steering, drive, braking, and direction indicator lights are autonomously controlled by selecting an autonomous driving mode. However, the driving assist method and the driving assist device of the present disclosure may be applied to a travel-assisted vehicle that assists some aspects of travel among drive, braking, steering, and direction indicator light manipulation, which are performed by the driver. In short, the method and device can be applied to a vehicle in which driving assistance is provided to the driver due to direction indicator light control being performed in accordance with the positional relationship that was assessed when the host vehicle enters a roundabout. In a vehicle that provides driving assistance to the driver, when the driver manipulates the direction indicator lights, for example, a direction indicator light determination is communicated to the driver by a display device. The driver preferably manipulates the direction indicator lights in accordance with the direction indicator light determination.

The laws of any country or region shall be observed when a vehicle to which the driving assist method and the driving assist device of the present disclosure are applied actually travels on a road.

The invention claimed is:

1. A driving assist method using a controller to calculate a travel route over which a host vehicle is caused to travel and to execute a driving assist control so that the host vehicle travels along the travel route, the driving assist method comprising:
assessing whether or not the host vehicle has arrived at a roundabout;
upon assessing that the host vehicle has arrived at a roundabout, assessing a positional relationship between a host vehicle entrance for the host vehicle and a host vehicle exit for the host vehicle in the roundabout based on the travel route; and performing a control of direction indicator lights in accordance with the positional relationship that was assessed when the host vehicle enters the roundabout;

assessing whether or not to extinguish the direction indicator lights according to the positional relationship that was assessed when the direction indicator lights are illuminated by the control; and performing a control to extinguish the direction indicator lights after the host vehicle has entered the roundabout when an assessment to extinguish the direction indicator lights has been made.

2. The driving assist method according to claim 1, further comprising
assessing whether or not to illuminate the direction indicator lights based on the position of the host vehicle exit when the direction indicator lights are illuminated by the control, and
performing a control to illuminate the direction indicator lights when an assessment to illuminate the direction indicator lights has been made.

3. The driving assist method according to claim 1, wherein
from the time the host vehicle enters through the host vehicle entrance until the host vehicle exits the roundabout, the current positional relationship between the current position of the host vehicle and the host vehicle exit is successively compared and an assessment is made as to whether or not a switching condition for switching the direction indicated by the direction indicator lights is fulfilled; and
when the switching condition is fulfilled, the direction indicated by the direction indicator lights is switched based on the switching condition.

4. The driving assist method according to claim 1, wherein
performing a control to determine which of the direction indicator lights indicating the left and right directions to illuminate in accordance with the positional relationship that was assessed.

5. The driving assist method according to claim 1, wherein
performing a control determine whether or not to illuminate the direction indicator lights in accordance with the positional relationship that was assessed.

6. The driving assist method according to claim 1, wherein
the assessment of whether or not the host vehicle has arrived at the roundabout is an assessment that the host vehicle has arrived at the roundabout when the host vehicle has come within a prescribed distance of the roundabout.

7. The driving assist method according to claim 1, wherein
the positional relationship is assessed from a relative angle between the host vehicle entrance and the host vehicle exit.

8. The driving assist method according to claim 1, wherein
the direction indicator light is extinguished after the host vehicle has entered the roundabout when the direction indicated by the direction indicator light that illuminates when the host vehicle enters the roundabout is opposite of the direction of rotation when the host vehicle is passing through the roundabout and when the host vehicle exit is an exit following the first exit after the host vehicle has come into the roundabout.

9. The driving assist method according to claim 1, wherein
when the host vehicle is to exit the roundabout, the direction indicated by the last illuminated direction indicator light is opposite of the direction of rotation when the host vehicle is passing through the roundabout.

10. A driving assist method using a controller to calculate a travel route over which a host vehicle is caused to travel and to execute a driving assist control so that the host vehicle travels along the travel route, the driving assist method using the controller comprising
assessing whether or not the host vehicle has arrived at a roundabout;
upon assessing that the host vehicle has arrived at the roundabout, assessing a positional relationship between a host vehicle entrance for the host vehicle and a host vehicle exit for the host vehicle in the roundabout based on the travel route;
performing a control of the direction indicator lights in accordance with the positional relationship that was assessed when the host vehicle enters the roundabout;
successively comparing the current positional relationship between the current position of the host vehicle and the host vehicle exit from the time the host vehicle enters through the host vehicle entrance until the host vehicle exits the roundabout and assesses whether or not a switching condition to switch the direction indicated by the direction indicator lights has been fulfilled when the direction indicator lights are illuminated by the control; and
switching the direction indicated by the direction indicator lights based on the switching condition when the switching condition is fulfilled, and continuing to illuminate the direction indicator lights when the switching condition is not fulfilled.

11. A driving assist device comprising:
a controller that calculates a travel route over which a host vehicle is caused to travel and that executes a driving assist control so that the host vehicle travels along the travel route, the controller including:
a roundabout arrival assessment part that assesses whether or not the host vehicle has arrived at a roundabout;
a positional relationship assessment part that assesses a positional relationship between a host vehicle entrance for the host vehicle and a host vehicle exit for the host vehicle in the roundabout based on the travel route when the roundabout arrival assessment part assesses that the host vehicle has arrived at the roundabout; and
a direction indicator light control part that performs a control of direction indicator lights in accordance with the positional relationship that was assessed of the positional relationship assessment part when the host vehicle enters the roundabout; and
the direction indicator light control part being configured to assess whether or not to extinguish the direction indicator lights according to the positional relationship that was assessed of the positional relationship assessment part when the direction indicator lights are illuminated by the control, and
the direction indicator light control part being configured to perform a control to extinguish the direction indicator lights after the host vehicle has entered the roundabout when an assessment to extinguish the direction indicator lights has been made.

12. A driving assist device comprising:
a controller that calculates a travel route over which a host vehicle is caused to travel and executes driving assist control so that the host vehicle travels along the travel route, the controller including:
a roundabout arrival assessment part that assesses whether or not the host vehicle has arrived at a roundabout;
a positional relationship assessment part that assesses a positional relationship between a host vehicle entrance for the host vehicle and a host vehicle exit for the host vehicle in the roundabout based on the travel route when the roundabout arrival assessment part assesses that the host vehicle has arrived at the roundabout; and
a direction indicator light control part that performs a control of direction indicator lights in accordance with the positional relationship that was assessed of the positional relationship assessment part when the host vehicle enters the roundabout; and the direction indicator light control part being configured to successively compare the current positional relationship between the current position of the host vehicle and the host vehicle exit from the time the host vehicle enters through the host vehicle entrance until the host vehicle exits the roundabout and assesses whether or not a switching condition to switch the direction indicated by the direction indicator lights has been fulfilled when the direction indicator lights are illuminated by said control, and the direction indicator light control part being configured to switch the direction indicated by the direction indicator lights based on the switching condition when the switching condition is fulfilled, and continues to illuminate the direction indicator lights when the switching condition is not fulfilled.

\* \* \* \* \*